United States Patent
Okamoto et al.

(10) Patent No.: US 9,393,740 B2
(45) Date of Patent: Jul. 19, 2016

(54) METHOD OF PRODUCING THREE-DIMENSIONAL STRUCTURE, APPARATUS FOR PRODUCING THREE-DIMENSIONAL STRUCTURE, AND THREE-DIMENSIONAL STRUCTURE

(71) Applicant: SEIKO EPSON CORPORATION, Tokyo (JP)

(72) Inventors: Eiji Okamoto, Nagano (JP); Toshimitsu Hirai, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/641,580

(22) Filed: Mar. 9, 2015

(65) Prior Publication Data

US 2015/0258734 A1    Sep. 17, 2015

(30) Foreign Application Priority Data

Mar. 14, 2014    (JP) .................. 2014-051282

(51) Int. Cl.
| | |
|---|---|
| G06K 19/02 | (2006.01) |
| B29C 67/00 | (2006.01) |
| G06K 19/077 | (2006.01) |
| B33Y 10/00 | (2015.01) |
| B33Y 30/00 | (2015.01) |
| B29L 31/34 | (2006.01) |
| B33Y 80/00 | (2015.01) |

(52) U.S. Cl.
CPC ...... *B29C 67/0059* (2013.01); *G06K 19/07722* (2013.01); *G06K 19/07749* (2013.01); *B29L 2031/34* (2013.01); *B33Y 10/00* (2014.12); *B33Y 30/00* (2014.12); *B33Y 80/00* (2014.12)

(58) Field of Classification Search
USPC .......................................... 235/451, 492, 488
See application file for complete search history.

(56) References Cited

U.S. PATENT DOCUMENTS

| | | | |
|---|---|---|---|
| 3,732,107 A | 5/1973 | Faust | |
| 3,857,885 A | 12/1974 | Faust | |
| 4,458,006 A | 7/1984 | Donges et al. | |
| 4,495,271 A | 1/1985 | Geissler et al. | |
| 4,530,747 A | 7/1985 | Donges et al. | |
| 4,987,053 A | 1/1991 | Gersdorf et al. | |
| 5,200,299 A | 4/1993 | Steppan et al. | |
| 5,204,055 A | 4/1993 | Sachs et al. | |
| 6,391,136 B1* | 5/2002 | Stickelbrocks | B65C 9/0006 156/247 |
| 7,492,326 B1* | 2/2009 | Bodlovic | H01Q 1/2225 174/257 |
| 8,072,333 B2* | 12/2011 | Ferguson | G06K 19/07745 235/492 |
| 2001/0042598 A1* | 11/2001 | Yamada | B81C 99/008 156/362 |
| 2005/0205202 A1* | 9/2005 | Chaoui | B32B 37/226 156/269 |
| 2006/0033110 A1* | 2/2006 | Alam | H01L 21/2007 257/74 |
| 2008/0105960 A1* | 5/2008 | See | H01L 21/561 257/676 |
| 2009/0314527 A1* | 12/2009 | Hatano | G06K 19/07745 174/255 |

(Continued)

FOREIGN PATENT DOCUMENTS

| | | |
|---|---|---|
| JP | 46-027926 A | 8/1971 |
| JP | 48-041708 A | 12/1973 |

(Continued)

*Primary Examiner* — Tuyen K Vo
(74) *Attorney, Agent, or Firm* — Global IP Counselors, LLP

(57) ABSTRACT

A method of producing a three-dimensional structure of the invention is a method of producing a three-dimensional structure by forming layers using a composition several times and laminating the layers, and an REID tag is embedded therein when the layers are formed several times.

16 Claims, 13 Drawing Sheets

(56) References Cited

U.S. PATENT DOCUMENTS

2010/0025481 A1* 2/2010 Brod .............. G06K 19/07722
                                                       235/492
2010/0044885 A1* 2/2010 Fuergut ............. H01L 21/561
                                                       257/784
2010/0219252 A1* 9/2010 Kikuchi .......... G06K 19/07749
                                                       235/488
2013/0126622 A1* 5/2013 Finn ............... G06K 19/07771
                                                       235/492

FOREIGN PATENT DOCUMENTS

| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 06-218712 A | 8/1994 |

* cited by examiner

METHOD OF PRODUCING THREE-DIMENSIONAL STRUCTURE, APPARATUS FOR PRODUCING THREE-DIMENSIONAL STRUCTURE, AND THREE-DIMENSIONAL STRUCTURE

BACKGROUND

1. Technical Field

The present invention relates to a method of producing a three-dimensional structure, an apparatus for producing a three-dimensional structure, and a three-dimensional structure.

2. Related Art

In the related art, for example, a method of forming a three-dimensional method based on a model of a three-dimensional product generated using three-dimensional CAD software or the like is known.

As the method of forming a three-dimensional structure, a lamination method is known. In the lamination method, a three-dimensional structure generally is formed by dividing a model of a three-dimensional product into multiple two-dimensional cross-sectional layers, sequentially forming cross-sectional members corresponding to respective two-dimensional cross-sectional layers, and sequentially laminating the cross-sectional members.

In the lamination method, a three-dimensional structure can be immediately formed when only a model of a three-dimensional structure intended to be formed is present. Further, it is possible to rapidly form a three-dimensional structure at a low price because a mold does not need to be created before forming. In addition, since a three-dimensional structure is formed by laminating cross-sectional members having a thin plate shape one by one, it is possible to form an integrated structure without being divided into plural components even in a case of a complicated product having an internal structure.

Moreover, in the lamination method, plural kinds of three-dimensional structures can be suitably produced by the same apparatus.

Further, in the lamination method, plural three-dimensional structures and plural kinds of three-dimensional structures can be concurrently produced, and this may depend on the size of the forming area (stage).

As such a lamination method, a method disclosed in JP-A-6-218712 can be exemplified.

However, in the related art, individual management in a case where plural three-dimensional structures and plural kinds of three-dimensional structures are produced is performed by an operator, but confirmation or management of an individually produced product becomes difficult depending on the shape, the quality of materials, or the like of the three-dimensional structure and the three-dimensional structures are mixed up in some cases.

SUMMARY

An advantage of some aspects of the invention is to provide a method of producing a three-dimensional structure capable of easily and reliably performing individual management of plural kinds of three-dimensional structures to be produced, an apparatus for producing a three-dimensional structure capable of easily and reliably performing individual management of plural kinds of three-dimensional structures to be produced, and a three-dimensional structure which can be subjected to individual management easily and reliably.

The above-described advantages are achieved by the following aspects of the invention.

According to an aspect of the invention, there is provided a method of producing a three-dimensional structure which produces a three-dimensional structure by forming layers using a composition several times and laminating the layers, in which an RFID tag is mounted on the layers.

In this manner, it is possible to provide a method of producing a three-dimensional structure capable of easily and reliably performing individual management of plural three-dimensional structures to be produced.

In the aspect of the method of producing a three-dimensional structure, it is preferable that the RFID tag is mounted on an area in a concave portion or an area surrounded by a convex portion.

In this manner, it is possible to effectively prevent positional displacement or the like of the RFID tag, to reduce the rate of defects in the three-dimensional structure, and to further improve the reliability of the three-dimensional structure.

In the aspect of the method of producing a three-dimensional structure, it is preferable that the RFID tag is provided with an adhesive layer, and the RFID tag is fixed to the layer formed earlier through the adhesive layer.

In this manner, it is possible to prevent the occurrence of unintentional positional displacement of the RFID tag and to effectively prevent disturbance of layers caused by the positional displacement.

In the aspect of the method of producing a three-dimensional structure, it is preferable that the composition includes grains.

In this manner, it is possible to make the dimensional precision of the three-dimensional structure excellent and to make the heat resistance or mechanical strength of the three-dimensional structure particularly excellent.

In the aspect of the method of producing a three-dimensional structure, it is preferable that the RFID tag is fixed to the layer formed earlier with a binder before a new layer is formed on the RFID tag.

In this manner, it is possible to more effectively prevent positional displacement of the RFID tag during the layer forming process after the RFID tag mounting process is performed.

In the aspect of the method of producing a three-dimensional structure, it is preferable that the composition is a curable ink to be ejected according to an ink jet method.

In this manner, it is possible to prevent and suppress wasting of materials during the production of the three-dimensional structure and to make productivity of the three-dimensional structure particularly excellent.

In the aspect of the method of producing a three-dimensional structure, it is preferable that identification information related to the three-dimensional structure is recorded in the RFID tag.

In this manner, it is possible to easily and reliably perform individual management of plural three-dimensional structures to be produced.

In the aspect of the invention, it is preferable that the method of producing a three-dimensional structure includes comparing identification information related to the three-dimensional structure recorded in the RFID tag before the RFID tag is mounted including information written thereon regarding the three-dimensional structure to be produced.

In this manner, it is possible to reduce the probability of using an RFID tag in which information different from the identification information related to the three-dimensional structure to be produced is written.

In the aspect of the method of producing a three-dimensional structure, it is preferable that a conductive portion functioning as an antenna of the RFID tag is formed according to an ink jet method.

In this manner, it is possible to make the sensitivity of communication of the three-dimensional structure which is finally obtained excellent even when an RFID tag without an antenna or an RFID tag having only a simple antenna is used for producing the three-dimensional structure.

According to another aspect of the invention, there is provided an apparatus for producing a three-dimensional structure which produces a three-dimensional structure by laminating layers using a composition, the apparatus including: a stage for which the composition is provided and on which the layer is formed; and an RFID tag mounting unit that mounts an RFID tag on the layer.

In this manner, it is possible to provide the apparatus for producing a three-dimensional structure capable of easily and reliably performing individual management of plural three-dimensional structures to be produced.

In the aspect of the invention, it is preferable that the apparatus for producing a three-dimensional structure further includes an information writing unit that writes identification information related to the three-dimensional structure on the RFID tag.

In this manner, it is not necessary to prepare the RFID tag in which the identification information related to the three-dimensional structure is written in advance and it is possible to suitably respond to changes to the specifications of the three-dimensional structure to be produced.

In the aspect of the invention, it is preferable that the apparatus for producing a three-dimensional structure further includes an information reading unit that reads identification information related to the three-dimensional structure written in the RFID tag.

In this manner, it is possible to reduce the probability of using the RFID tag in which information different from the identification information related to the three-dimensional structure to be produced is written.

According to still another aspect of the invention, there is provided a three-dimensional structure which is produced using the method according to the invention.

In this manner, it is possible to provide a three-dimensional structure which can be subjected to individual management easily and reliably.

According to still another aspect of the invention, there is provided a three-dimensional structure which is produced using the apparatus for producing a three-dimensional structure of the invention.

In this manner, it is possible to provide a three-dimensional structure which can be subjected to individual management easily and reliably.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described with reference to the accompanying drawings.
Method of Producing Three-Dimensional Structure First, a method of producing a three-dimensional structure of the invention will be described.

First Embodiment

Figure 1A:
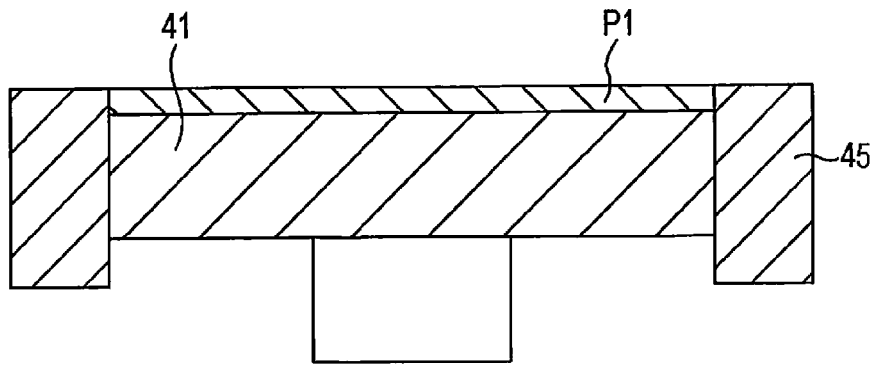
FIGS. 1A to 1D are cross-sectional views schematically illustrating each process of a method of producing a three-dimensional structure according to a first embodiment of the invention.
Figure 1B:
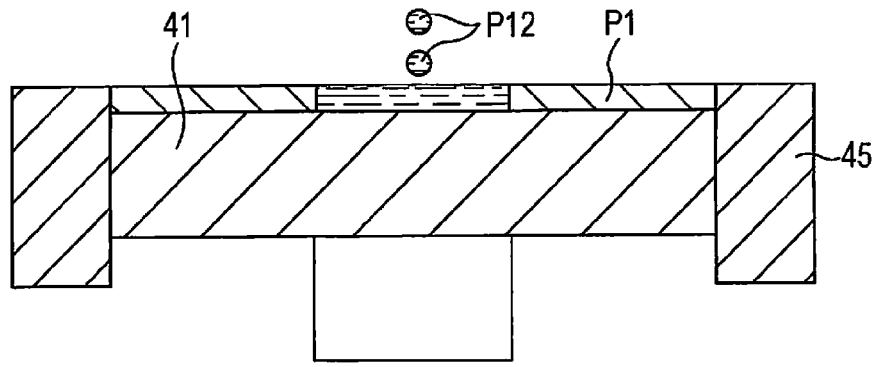
Figure 1C:
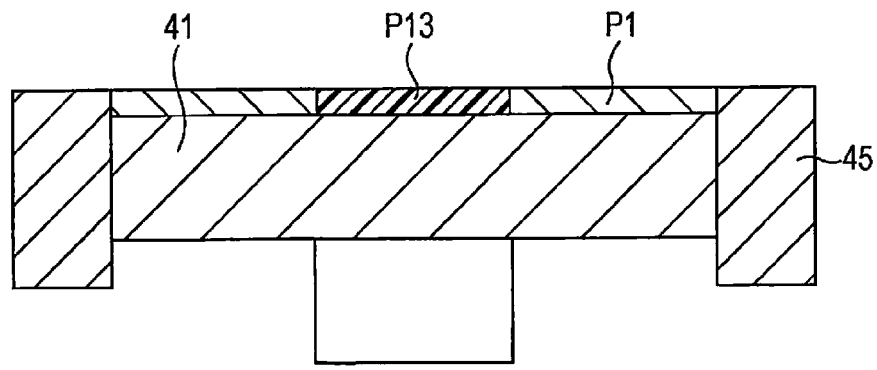
Figure 1D:
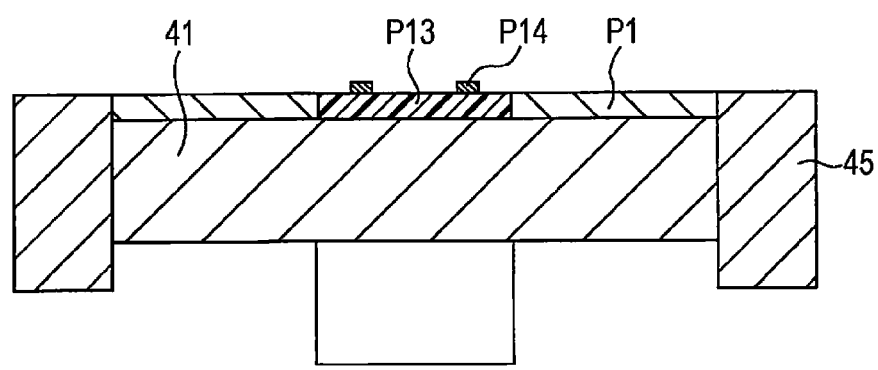
Figure 2A:
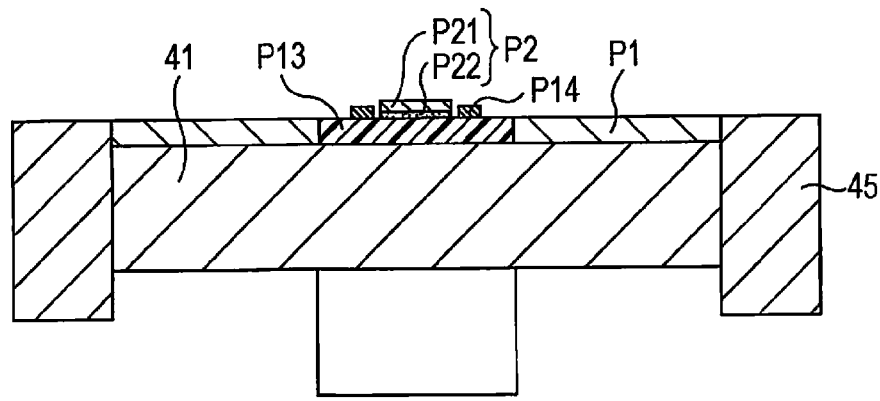
FIGS. 2A to 2D are cross-sectional views schematically illustrating each process of the method of producing a three-dimensional structure according to the first embodiment of the invention.
Figure 2B:
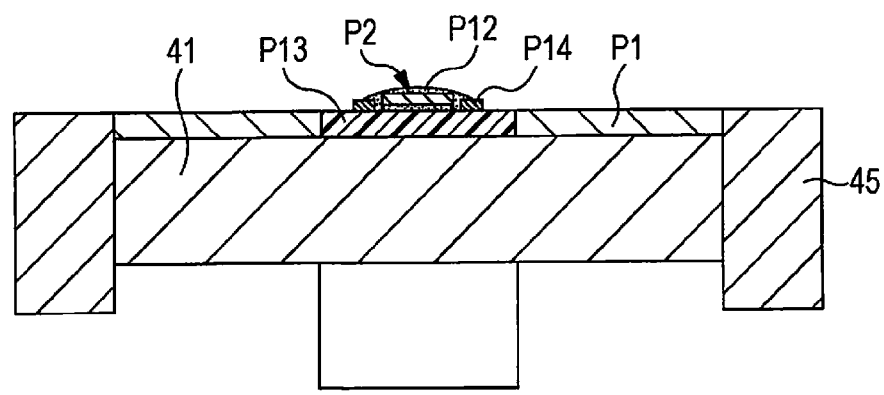
Figure 2C:
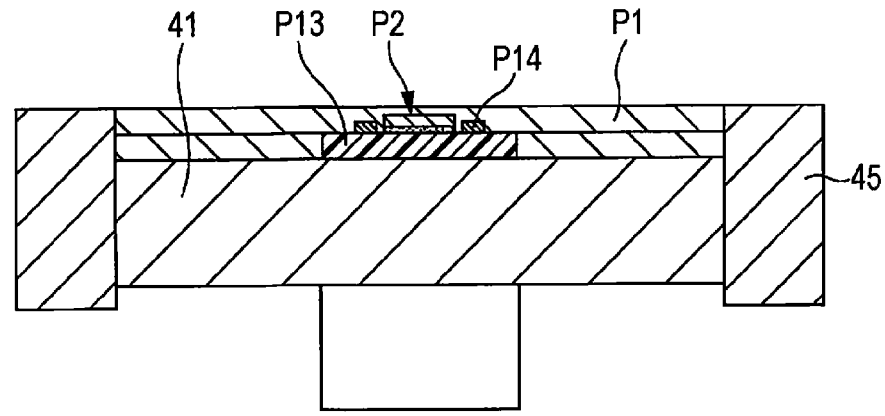
Figure 2D:
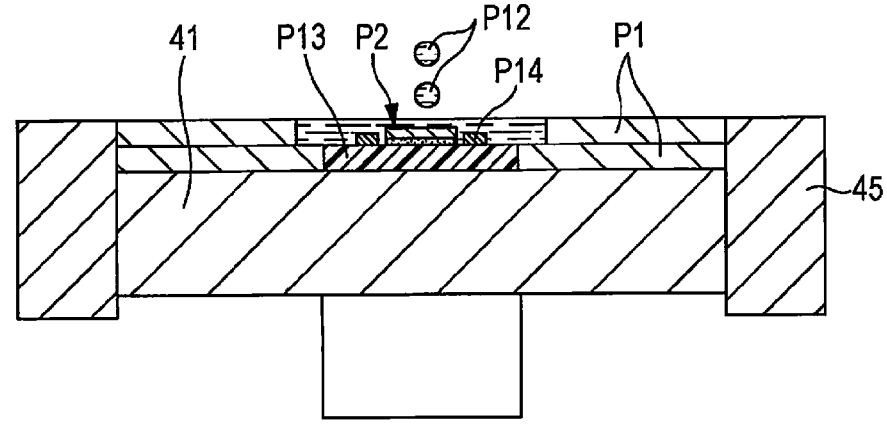
Figure 3A:
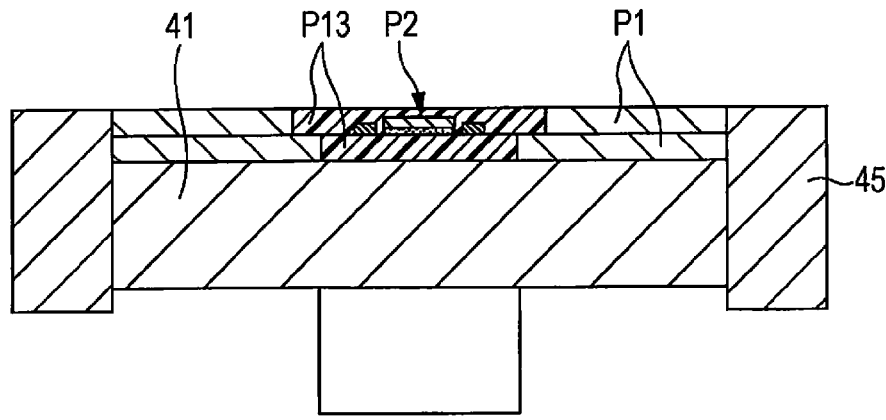
FIGS. 3A to 3C are cross-sectional views schematically illustrating each process of the method of producing a three-dimensional structure according to the first embodiment of the invention.
Figure 3B:
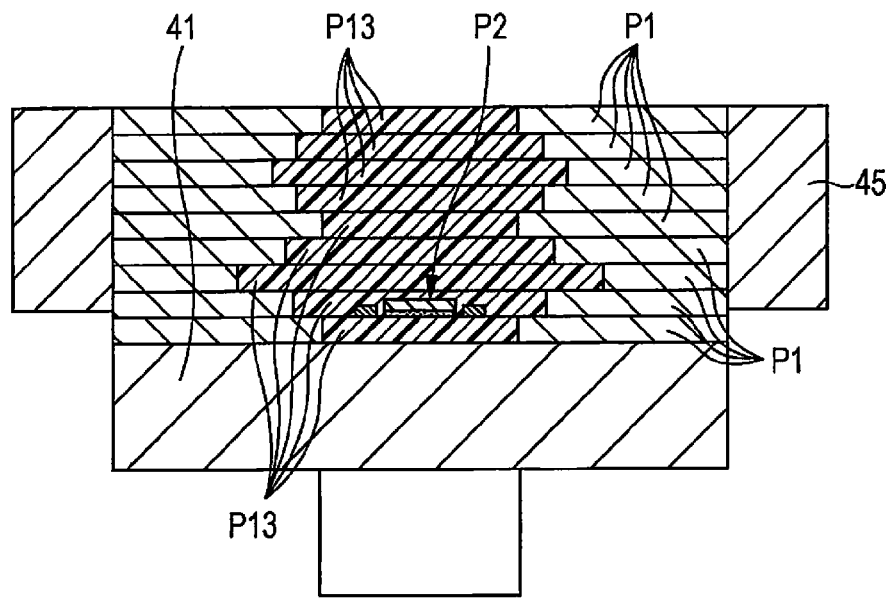
Figure 3C:
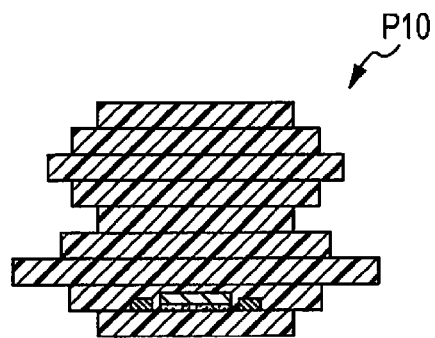
Figure 4A:
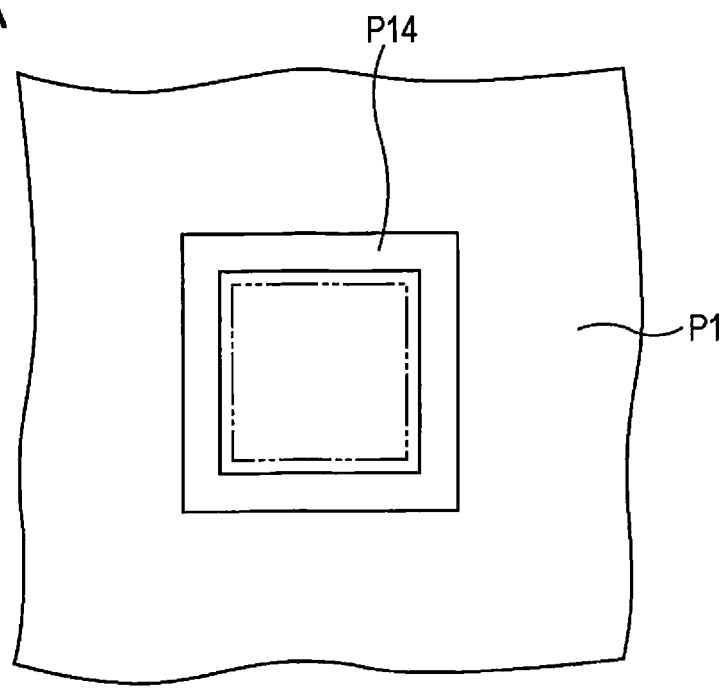
FIGS. 4A and 4B are plan views for describing the shape of a convex portion to be formed in a convex portion forming process.
Figure 4B:
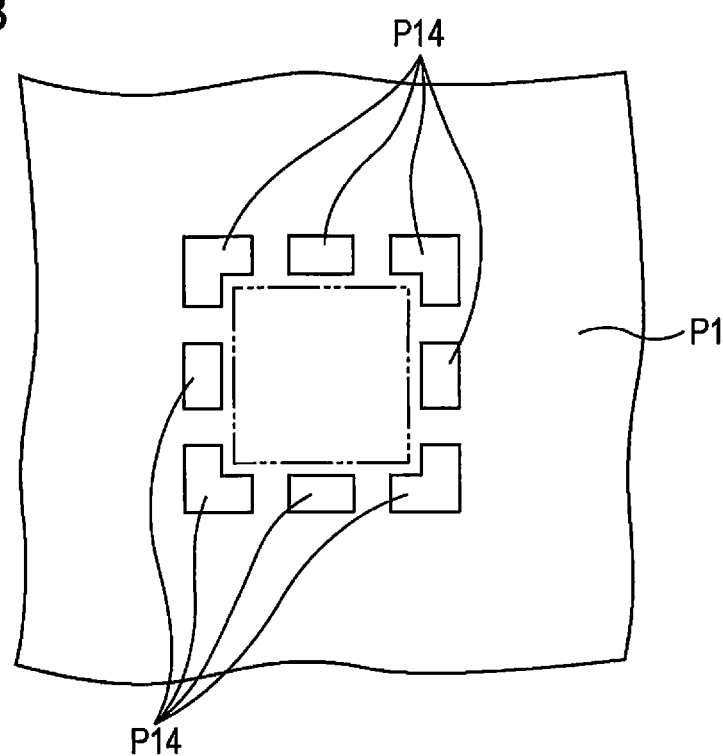
Figure 5A:
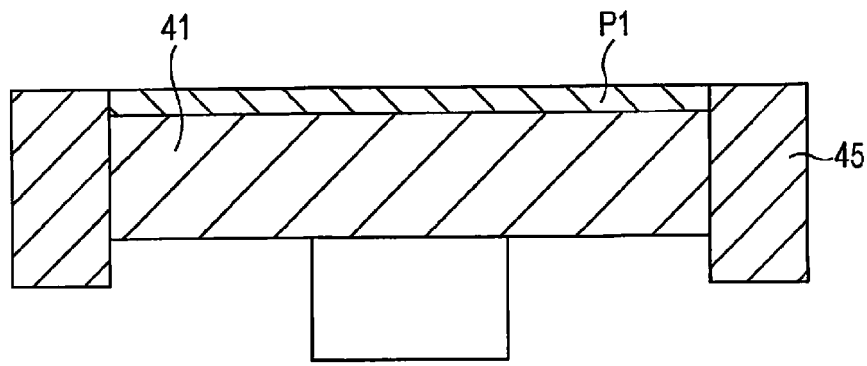
FIGS. 5A to 5D are cross-sectional views schematically illustrating each process of a method of producing a three-dimensional structure according to a second embodiment of the invention.
Figure 5B:
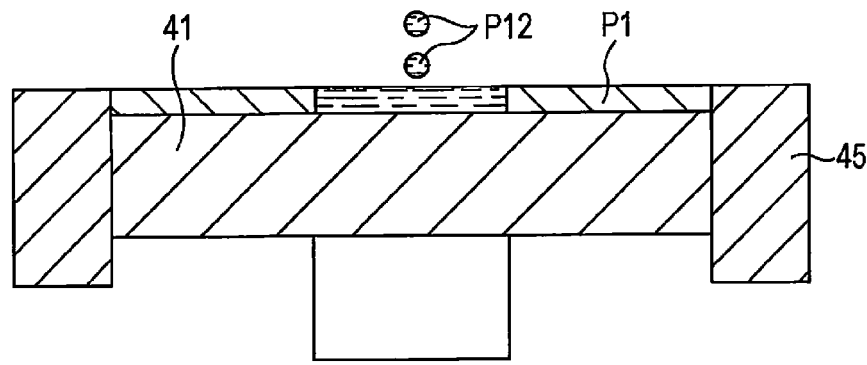
Figure 5C:
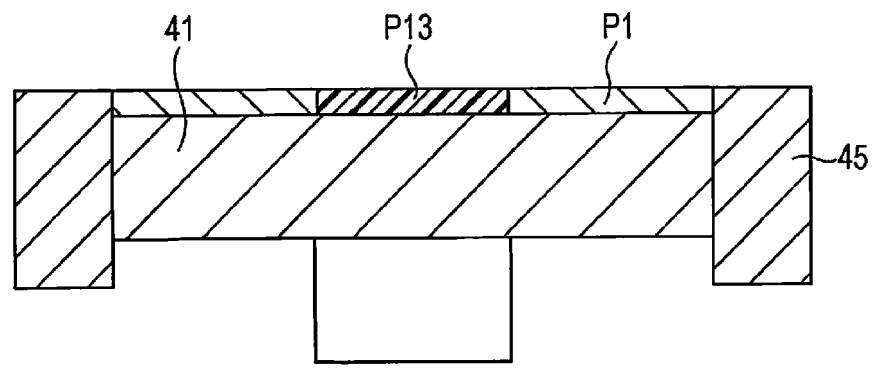
Figure 5D:
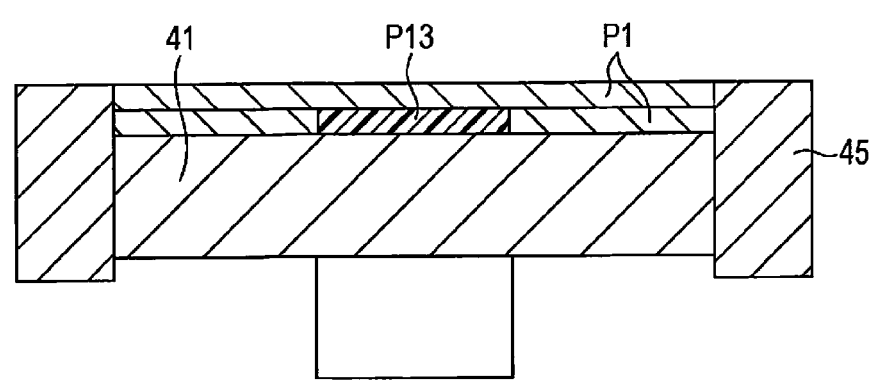
Figure 6A:
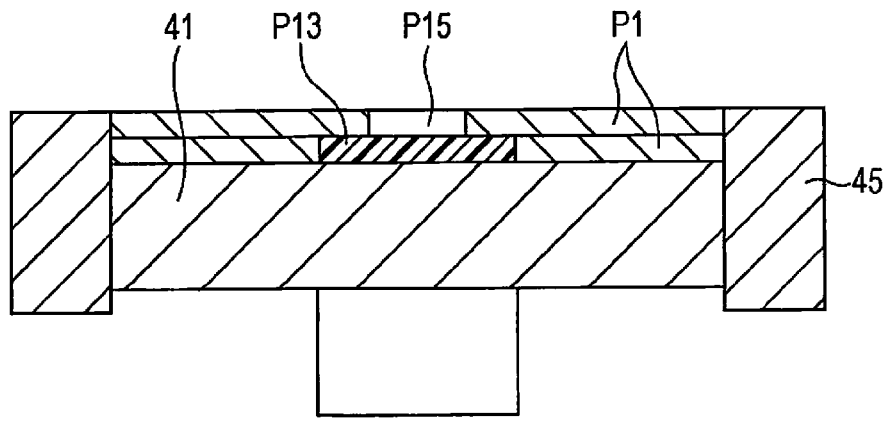
FIGS. 6A to 6C are cross-sectional views schematically illustrating each process of the method of producing a three-dimensional structure according to the second embodiment of the invention.
Figure 6B:
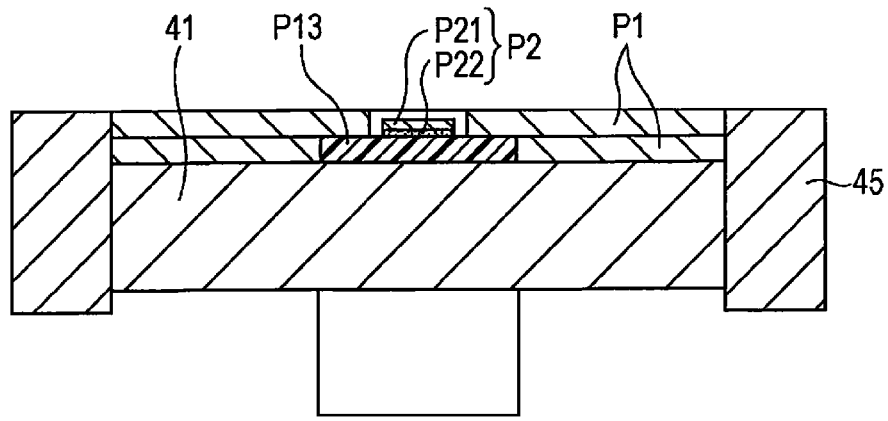
Figure 6C:
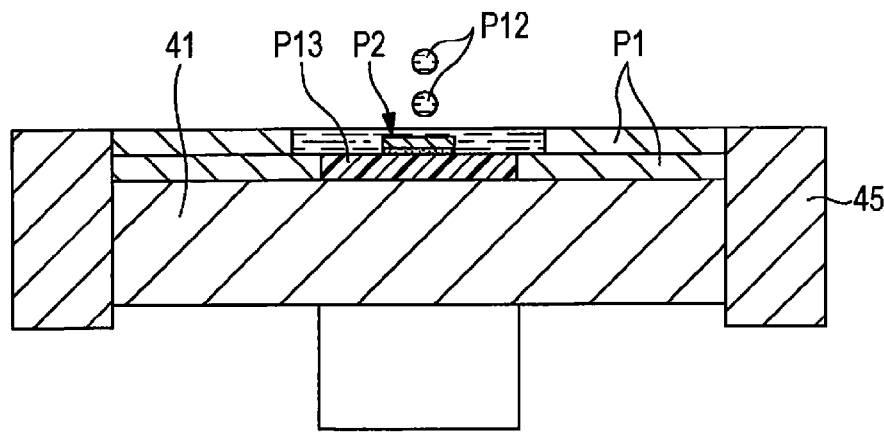
Figure 7A:
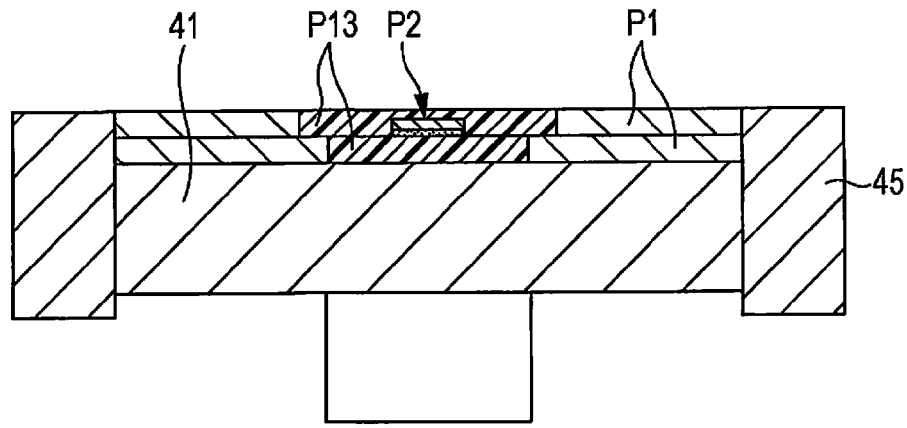
FIGS. 7A to 7C are cross-sectional views schematically illustrating each process of the method of producing a three-dimensional structure according to the second embodiment of the invention.
Figure 7B:
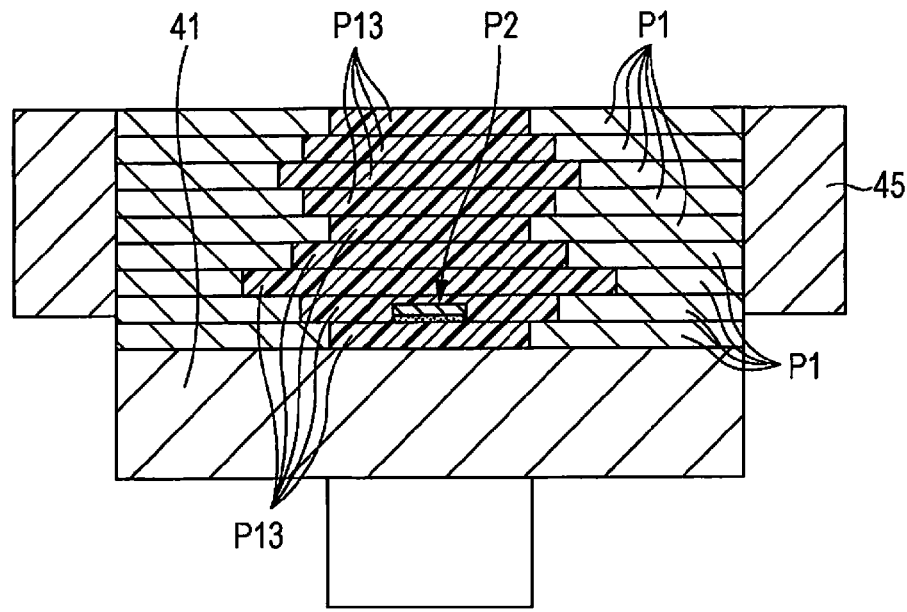
Figure 7C:
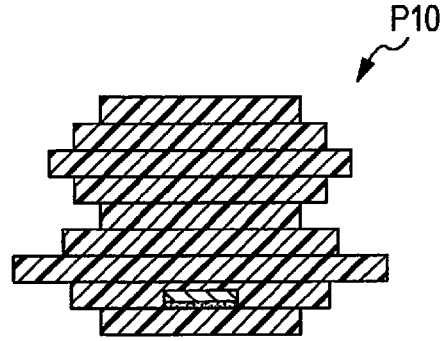
Figure 8A:
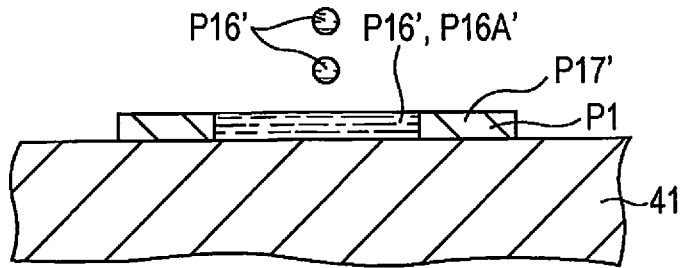
FIGS. 8A to 8E are cross-sectional views schematically illustrating each process of a method of producing a three-dimensional structure according to a third embodiment of the invention.
Figure 8B:
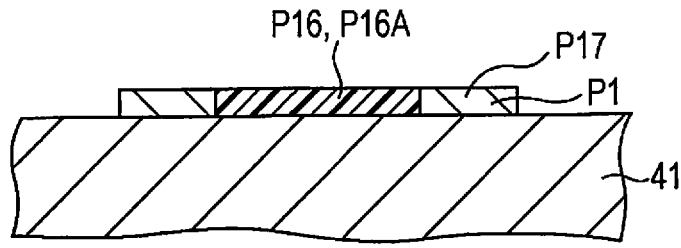
Figure 8C:
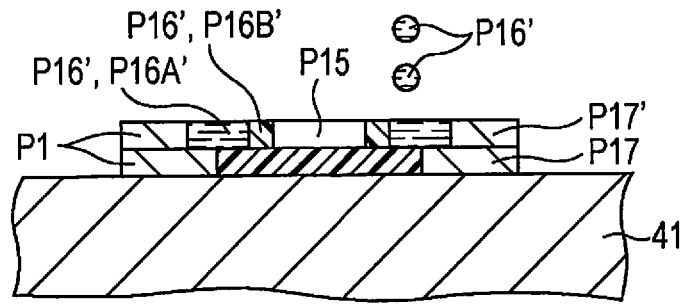
Figure 8D:
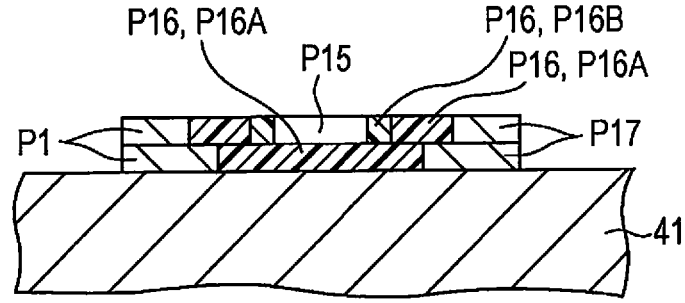
Figure 8E:
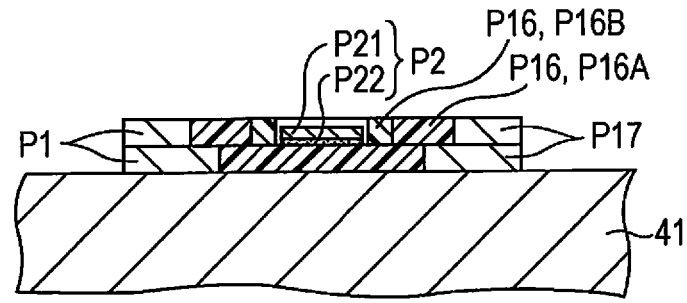
Figure 9A:
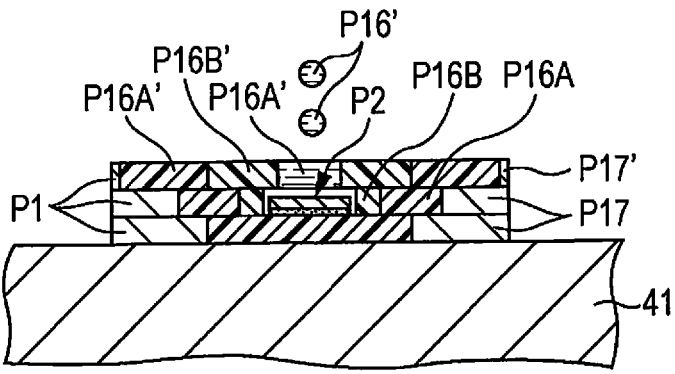
FIGS. 9A to 9D are cross-sectional views schematically illustrating each process of the method of producing a three-dimensional structure according to the third embodiment of the invention.
Figure 9B:
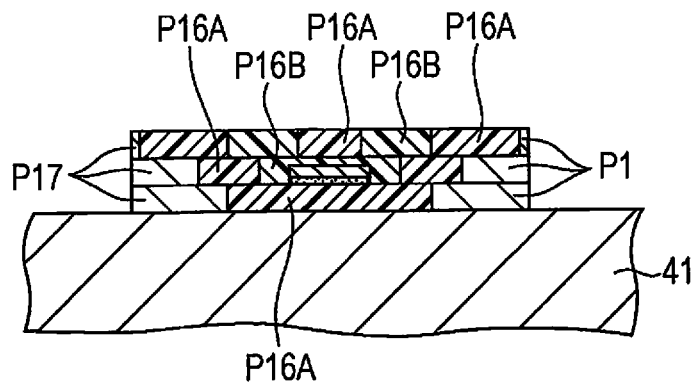
Figure 9C:
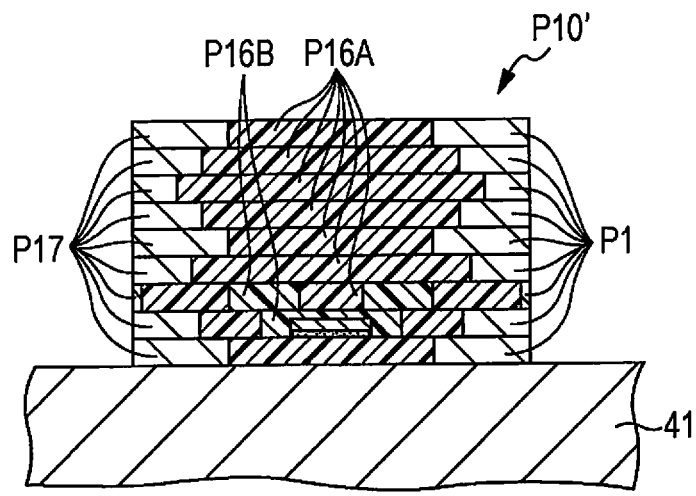
Figure 9D:
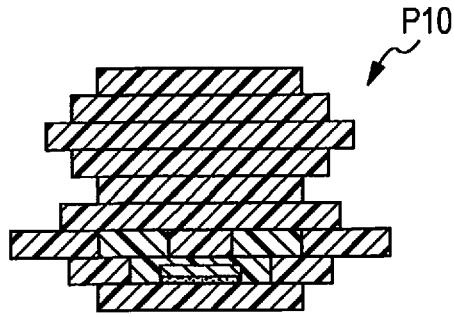

FIGS. 1A to 3C are cross-sectional views schematically illustrating each process of the method of producing a three-dimensional structure according to a first embodiment of the invention and FIGS. 4A and 4B are plan views for describing the shape of a convex portion to be formed in a convex portion forming process. In FIGS. 4A and 4B, an area on which an RFID tag is mounted is indicated by a two-dot chain line.

As illustrated in FIGS. 1A to 3C, the method of producing a three-dimensional structure of the present embodiment includes a layer forming process (1A and 2C) of forming a layer P1 having a predetermined thickness in an area surrounded by a side surface supporting portion (frame) 45 using a composition P11 containing grains P111; a binding solution providing process (1B and 2D) of providing a binding solution P12 for the layer P1 according to an ink jet method; and a curing process (bonding process) (1C and 3A) of forming a curing unit (bonding unit) P13 in the layer P1 by allowing a binder contained in the binding solution P12 which is provided for the layer P1 to be cured and bonding the grains P111 thereto. In addition, the method thereof further includes an unbonded particle removing process (3C) of removing particles, which are not bonded, among grains P111 constituting each layer P1 with a binder after the above-described processes are sequentially and repeatedly performed.

Further, an RFID tag mounting process (2A) of mounting an RFID tag P2 on the layer P1 is included in the layer forming process which is performed several times (in the configuration of the figure, at the timing after the curing process (1C) with respect to the first layer P1 and before the layer forming process (2C) of forming the second layer).

In addition, prior to the RFID mounting process, a comparison process (not illustrated) of comparing identification information related to the three-dimensional structure P10 which is recorded in the RFID tag P2 and information related to the three-dimensional structure P10 to be produced is included.

Hereinafter, each process will be described.

Layer Forming Process

In the layer forming process, the layer P1 having a predetermined thickness is formed (1A and 2C) using the composition (composition for three-dimensional forming) P11 containing grains P111.

In this manner, it is possible to make the dimensional precision of the three-dimensional structure P10 which is finally obtained excellent using the composition P11 containing the grains P111. Further, it is possible to make the heat resistance or mechanical strength of the three-dimensional structure P10 particularly excellent.

Moreover, the composition P11 will be described in detail.

In this process, when the layer P1 is formed the surface thereof is flattened using a flattening unit.

In the first layer forming process, the layer P1 having a predetermined thickness is formed on the surface of a stage 41 (1A). At this time, the side surface of the stage 41 is tightly adhered (contact) to the side surface supporting portion 45 and detachment of the composition P11 from a space between the stage 41 and the side surface supporting portion 45 is prevented.

In the second or subsequent layer forming process, a new layer P1 (second layer) is formed (2C) on the surface of the layer P1 (first layer) formed in the previous process. At this time, the side surface the layer P1 (the layer P1 provided at least on the uppermost side in a case where plural layers P1 are present on the stage 41) of the stage 41 is tightly adhered (contact) to the side surface supporting portion 45 and thus detachment of the composition P11 from a space between the stage 41 and the layer P1 of the stage 41 is prevented.

In this process, the composition P11 may be heated. In this manner, for example, in the case where the composition P1 includes a melting component, it is possible to suitably make the composition P11 into a more paste-like composition.

The viscosity (value measured using an E-type viscometer (VISCONIC ELD, manufactured by Tokyo Keiki Co., Ltd.)) of the composition P11 in this process is preferably in the range of 7000 mPa·s to 60000 mPa·s and more preferably in the range of 10000 mPa·s to 50000 mPa·s. In this manner, it is possible to effectively prevent the generation of unintentional unevenness in the film thickness of the layer P1 to be formed.

The thickness of the layer P1 formed in this process, which is not particularly limited, is preferably in the range of 30 μm to 500 μm and more preferably in the range of 70 μm to 150 μm. In this manner, it is possible to make the productivity of the three-dimensional structure P10 sufficiently excellent, to effectively prevent the generation or the like of unintentional unevenness in the three-dimensional structure P10 to be produced, and to make the dimensional precision of the three-dimensional structure P10 particularly excellent.

Binding Solution Providing Process

After the layer P1 is formed in the layer forming process, the binding solution P12 for bonding the grains P111 constituting the layer P1 is provided for the layer P1 according to an ink jet method (1B and 2D).

In this process, the binding solution P12 is selectively provided for only a region corresponding to an entity portion (region with an entity) of the three-dimensional structure P10 in the layer P1.

In this manner, it is possible to firmly bond the grains Pill, constituting the layer P1, to each other and to finally form the curing unit (bonding unit) P13 having a desirable shape. Further, it is possible to make the mechanical strength of the three-dimensional structure P10 which is finally obtained excellent.

In this process, since the binding solution P12 is provided according to an ink jet method, it is possible to provide the binding solution P12 with excellent reproducibility even when the providing pattern of the binding solution P12 has a fine shape. As a result, it is possible to particularly improve the dimensional precision of the three-dimensional structure P10 which is finally obtained.

Moreover, the binding solution P12 will be described below in detail.

Curing Process (Bonding Process)

After the binding solution P12 is provided for the layer P1 in the binding solution providing process, the binder P121 included in the binding solution P12 provided for the layer P1 is cured and the curing unit (bonding unit) P13 is formed (1C and 3A). In this manner, it is possible to make the bonding strength between the binder P121 and the grains P111 particularly excellent and thus it is possible to make the mechanical strength of the three-dimensional structure P10 which is finally obtained particularly excellent.

This process varies depending on the kind of binder P121 used. For example, the process can be performed by heating in a case where the binder P121 is a thermosetting resin and the process can be performed by irradiation with corresponding light in a case where the binder P121 is a light curable resin (for example, the process can be performed by irradiation with UV rays in a case where the binder P121 is a UV curable resin).

Moreover, the binding solution providing process and the curing process may be concurrently performed. That is, a curing reaction may sequentially progress from the region for which the binding solution P12 is provided before the entire patterns of one entire layer P1 are formed.

Moreover, for example, in a case where the binder P121 is not a curable component, this process may be omitted. In this case, the above-described binding solution providing process serves as the bonding process.

RFID Tag Mounting Process

The radio frequency identification (RFID) tag P2 is embedded in the three-dimensional structure P10 by mounting the RFID tag P2 (2A) during the layer forming process which is performed several times. That is, the RFID tag P2 is embedded between the layers P1 by mounting the RFID tag P2 on the layer P1 formed earlier and then forming a new layer P1.

In this manner, the three-dimensional structure P10 is obtained as a product in which the RFID tag P2 is sealed therein. As a result, it is possible to easily and reliably perform individual management of the plural three-dimensional structures P10 to be produced.

The identification information related to the three-dimensional structure P10 is recorded in the RFID tag P2.

When such an RFID tag P2 is incorporated in the three-dimensional structure, it is possible to easily and reliably perform individual management of the plural three-dimensional structures P10 to be produced.

Examples of the information written in the RFID tag P2 include user information, information related to the time of manufacture (for example, the year and month of manufacture) and manufacturing conditions (the kinds of materials used for manufacture, specifications, resolution, and the like), information related to the distribution process, and positional information related to assembly order and an assembly in a case where one structure (assembly) is obtained by assembling the plural three-dimensional structures P10 (for example, a model such as a plastic model). Further, the information written in the RFID tag P2 can be used for anti-theft and anti-duplication.

Examples of the shape of RFID tag P2 include any shape such as a label shape, a card shape, a coin shape, or a stick shape.

In the present embodiment, the RFID tag P2 includes an RFID tag main body P21 and an adhesive layer P22.

In this manner, the RFID tag P2 is firmly bonded to the layer P1 (bonding unit P13) on the lower side by the adhesive layer P22 so that generation of unintentional positional displacement of the RFID tag P2 or disturbance of the layer P1 caused by the generation of unintentional positional displacement thereof is effectively prevented in the subsequent layer forming process.

The adhesive layer P22 may be a layer having adhesiveness or stickiness and can be formed of various adhesives or stickers. Examples of the adhesive include a rubber adhesive, an epoxy adhesive, a cyanoacrylic adhesive, a silicone adhesive, and a vinyl adhesive. Further, the binding solution P12 or the binder P121 may be used. Examples of the sticker include a rubber sticker (natural rubber, SBR: styrene•butadiene rubber, or butyl rubber), an acrylic sticker (solvent type or emulsion type), a hot melt sticker, and a silicone sticker.

Particularly, in the present embodiment, the RFID tag P2 is mounted on the curing unit P13 with respect to the layer P1 on which the curing unit P13 is formed.

Since the shape of the curing unit P13 is very stable, unintentional modification or the like of the layer P1 while the RFID tag P2 is mounted is effectively prevented. As a result, the dimensional precision of the three-dimensional structure P10 which is finally obtained becomes particularly excellent. Since it is possible to make the bonding strength between the RFID tag P2 and the layer P1 (bonding unit P13) provided on the lower side particularly excellent, it is possible to make the mechanical strength and reliability of the three-dimensional structure P10 which is finally obtained particularly excellent.

This process can be suitably performed using a SCARA robot or the like.

The thickness of the RFID tag R2, which is not particularly limited, is preferably in the range of 7.5 µm to 300 µm and more preferably in the range of 12.5 µm to 250 µm.

Convex Portion Forming Process

In the present embodiment, a convex portion P14 is formed (1D) around the area on which the RFID tag P2 is mounted before the above-described RFID tag mounting process.

In this manner, it is effectively possible to prevent positional displacement of the RFID P2 during the RFID tag mounting process or positional displacement of the RFID tag P2 during the layer forming process subsequent to the RFID tag mounting process. Further, in a case where the RFID tag P2 is not mounted on a target region during the RFID tag mounting process, it is possible to perform mounting of the RFID tag P2 again if necessary because determination of the mounting becomes easy, and to reduce the rate of defects in the three-dimensional structure P10, and to further improve the reliability of the three-dimensional structure P10.

The convex portion P14 may be formed so as to surround the entire circumference of the RFID tag P2 to be mounted as illustrated in FIG. 4A or may be selectively formed in a region corresponding to a portion of the outer circumference of the RFID tag P2 to be mounted as illustrated in FIG. 4B.

It is preferable that the shape of the RFID tag P2 is a rectangle when seen in a plan view and the convex portion P14 is provided on a side facing the rectangle and/or in a region corresponding to an angle facing the rectangle in a case where the convex portion P14 is selectively formed in a region corresponding to a portion of the outer circumference of the RFID tag P2 to be mounted.

In this manner, it is possible to make the area of a region in which the convex portion P14 is formed relatively small and to better exhibit the above-described effects.

The height H of the convex portion P14 is preferably in the range of 3.0 µm to 300 µm and more preferably in the range of 5.0 µm to 70 µm.

In this manner, it is possible to prevent the thickness of the layer P1 to be formed from being extremely large and to more effectively prevent unintentional movement of the RFID tag P2.

When the height of the convex portion P14 is set as H [µm] and the thickness of the RFID tag P2 is set as T [µm], it is possible to satisfy the relationship of "$0.20 \leq H/T \leq 1.0$" and more preferable to satisfy the relationship of "$0.30 \leq H/T \leq 0.8$".

Comparison Process

Further, in the present embodiment, a comparison process (not illustrated) of comparing the identification information related to the three-dimensional structure to be recorded in the RFID tag P2 with the information related to the three-dimensional structure P10 to be produced is performed before a process of mounting the RFID tag P2 on the layer P1.

In this manner, it is possible to reduce the probability of using an RFI tag P2 in which information different from the identification information related to the three-dimensional structure P10 to be produced is written.

RFID Tag Fixing Process

In the present embodiment, the RFID tag P2 is fixed to the layer P1 formed earlier (2B) with the binding solution P12 (binder P121) before a new layer P1 is formed on the RFID tag P2.

In this manner, it is possible to more effectively prevent the positional displacement or the like of the RFID tag P2 during the layer forming process after the RFID tag mounting process.

As the binding solution P12 (binder P121), for example, the same binding solution used in the above-described binding solution providing process can be used.

Further, the binding solution P12 (binder P121) used for fixation of the RFID tag P2 can be allowed to be cured in the same manner described in the curing process (binding process) above.

Unbonded Particle Removing Process

Further, as a post-treatment process, an unbonded particle removing process (3C) of removing unbonded particles among grains P111 constituting each layer P1 which are not bonded together with the binder P121 is performed after the above-described process is repeatedly performed. In this manner, the three-dimensional structure P10 is removed.

Specific examples of the method of this process include a method of brushing unbonded particles using a brush or the like; a method of removing unbonded particles through suction; a method of blowing gas such as air thereto; a method of providing a liquid such as water (for example, a method of immersing a laminate obtained in the above-described manner in a liquid or a method of blowing a liquid); and a method of providing vibration such as ultrasonic vibration thereto. Further, these methods can be used in a combination of two or more kinds thereof selected from these. More specifically, the method of immersing a laminate in a liquid such as water or a method of providing ultrasonic vibration in a state in which a laminate is immersed in a liquid such as water can be performed after gas such as air is blown thereto. Among these, it is preferable that a method of providing a liquid including water (particularly, a method of immersing a laminate in a liquid containing water) for a laminate obtained in the above-described manner is employed.

Second Embodiment

Next, a method of producing a three-dimensional structure according to a second embodiment of the invention will be described.

FIGS. 5A to 7C are cross-sectional views schematically illustrating each process of the method of producing a three-dimensional structure according to the second embodiment of the invention. In the description below, differences from the above-described embodiment will be mainly described and the same description will not be repeated.

As illustrated in FIGS. 5A to 7C, the method of producing a three-dimensional structure of the present embodiment includes a layer forming process (5A and 5D) of forming a layer P1 having a predetermined thickness in an area surrounded by a side surface supporting portion (frame) 45 using a composition P11 containing grains P111; a binding solution providing process (5B and 6C) of providing a binding solution P12 for the layer P1 according to an ink jet method; and a curing process (bonding process) (5C and 7A) of forming a curing unit (bonding unit) P13 in the layer P1 by allowing a binder P121 contained in the binding solution P12 which is provided for the layer P1 to be cured and bonding the grains P111 thereto. In addition, the method thereof further includes an unbonded particle removing process (7C) of removing particles, which are not bonded, among grains P111 constituting each layer P1 with the binder P121 after the above-described processes are sequentially and repeatedly performed.

Further, in the present embodiment, a concave portion forming process (6A) of forming a concave portion P15 by removing a part of the temporarily formed layer P1 and an RFID tag mounting process (6B) of mounting an RFID tag P2 on the concave portion P15 subsequent to the concave portion forming process are included.

In addition, prior to the RFID mounting process, a comparison process (not illustrated) of comparing identification information related to the three-dimensional structure P10 which is recorded in the RFID tag P2 and information related to the three-dimensional structure P10 to be produced is included.

That is, the present embodiment is the same as the above-described embodiment except that the concave portion P15 is formed by removing a part of the layer P1 instead of forming the convex portion P14 with the binding solution P12 (binder P121) and the timing of the RFID tag mounting process is different from that of the above-described embodiment.

Concave Portion Forming Process

In the concave portion forming process, the concave portion P15 is formed in a layer P1 (second layer) newly formed on the layer P1 formed earlier (first layer, the layer P1 on which the curing unit P13 is formed).

The concave portion P15 can be suitably formed through suction of the composition P11, contact with a sticking material, contact with a member including a solvent, or the like.

In the configuration illustrated in the figure, the entire layer P1 (second layer) in which the RFID tag P2 is embedded in the thickness direction is removed, but only a part of the layer P1 (second layer) in the thickness direction may be removed.

Third Embodiment

Next, a method of producing a three-dimensional structure according to a third embodiment of the invention will be described.

FIGS. 8A to 9D are cross-sectional views schematically illustrating each process of the method of producing a three-dimensional structure according to the third embodiment of the invention. In the description below, differences from the above-described embodiment will be mainly described and the same description will not be repeated.

As illustrated in FIGS. 8A to 9D, the production method of the present embodiment includes an ink ejecting process (8A, 8C, and 9A) of ejecting an ink P16' for forming an entity portion including a curable resin and an ink P17' for forming a supporting portion including a curable resin with a predetermined pattern according to an ink jet method; a curing process (8B, 8D, and 9B) of forming the layer P1 including an entity portion P16 and a supporting portion P17 by allowing the ejected ink P16' for forming an entity portion and the ink P17' for forming a supporting portion to be cured; and a supporting portion removing process (9D) of removing the supporting portion P17 after the above-described processes are sequentially and repeatedly performed and a temporarily formed body P10' is obtained (9C).

Further, prior to the RFID mounting process, a comparison process (not illustrated) of comparing identification information related to the three-dimensional structure P10 which is recorded in the RFID tag P2 with information related to the three-dimensional structure P10 to be produced is included.

In this manner, in the present embodiment, the layer P1 is formed by the ink ejecting process and the curing process. That is, in the present embodiment, the layer forming process includes the ink ejecting process and the curing process.

In this manner, in the present embodiment, a layer is formed using a curable ink to be ejected with an ink jet method as a composition without forming a layer while flattening a composition including grains using a flattening unit.

In this manner, since the composition can be selectively provided for a portion of a forming area (area on the stage 41) which needs the composition, it is possible to prevent and suppress wasting of materials during the production of the three-dimensional structure P10. For this reason, it is advantageous from viewpoints of reducing the production cost of the three-dimensional structure P10 and saving resources. Further, it is possible to reduce the number of processes as a whole, to omit or simplify processes such as a process of recovering materials, and to make the productivity of the three-dimensional structure P10 particularly excellent.

Further, an RFID tag mounting process (8E) of mounting the RFID tag on the layer P1 is included in the layer forming process performed several times (in the configuration of the figure, at the timing after the layer forming process of forming the second layer and before the layer forming process of forming the third layer).

Hereinafter, each process will be described.

Ink Ejecting Process (Ink Providing Process)

In the ink ejecting process, the ink P16' for forming an entity portion including a curable resin and the ink P17' for forming a supporting portion including a curable resin are ejected (8A, 8C, and 9A) with a predetermined pattern according to an ink jet method.

More specifically, the ink P16' for forming an entity portion is provided for an area which becomes an entity portion P16 of the three-dimensional structure P10 and the ink P17' for forming a supporting portion is provided for an area adjacent to an area which becomes the outermost layer of the entity portion P16 of the three-dimensional structure P10, that is, an area on the surface side of the outermost layer.

In the first ink ejecting process, the inks (the ink P16' for forming an entity portion and the ink P17' for forming a supporting portion) are ejected (8A) on the stage 41. In the second or subsequent ink ejecting process, the inks (the ink P16' for forming an entity portion and the ink P17' for forming a supporting portion) are ejected (8C and 9A) on the layer P1.

In this manner, in the invention, the ink (ink P17' for forming a supporting portion) is provided for the surface side without providing the ink (ink P16' for forming an entity portion) for a portion which becomes the entity portion P16 of the three-dimensional structure P10.

In this manner, it is possible to suitably support the ink P16' for forming an entity portion for forming an upper layer (second layer) by the supporting portion P17 which is the lower layer (first layer) even when the layer (second layer) constituting the three-dimensional structure P10 includes a portion protruding from the outer circumference of the layer (first layer) lower than the second layer (for example, in the figure, the relationship between the first layer and the second layer from the bottom, the relationship between the second layer and the third layer from the bottom, or the relationship between the fourth layer and the fifth layer from the bottom) by proving the ink P17' for forming a supporting portion and forming the supporting portion P17. Accordingly, it is possible to suitably prevent unintentional deformation (particularly, sagging or the like) of the entity portion P16 and to make the dimensional precision of the three-dimensional formed body P10 which is finally obtained particularly excellent.

Moreover, in this process, since the inks (the ink P16' for forming an entity portion and the ink P17' for forming a supporting portion) are provided according to an ink jet method, the inks can be provided with excellent reproducibility even when the providing pattern of the inks (the ink P16' for forming an entity portion and the ink P17' for forming a supporting portion) have a fine shape. As a result, it is possible to particularly improve the dimensional precision of the three-dimensional structure P10 which is finally obtained and to more suitably control the appearance of the surface shape of the three-dimensional structure P10.

In the configuration illustrated in the figure, in this process, the concave portion P15 is formed in a portion on which the RFID tag P2 is mounted in the subsequent process. In this manner, in the present embodiment, since the ink (composition) is provided according to an ink jet method, it is possible to suitably form the concave portion P15 during the layer forming process even when a concave portion or a convex portion is not formed during a process different from the layer forming process. Accordingly, it is possible to make the productivity of the three-dimensional structure P10 particularly excellent. Further, it is possible to make the positional precision or the dimensional precision of the concave portion P15 excellent by forming the layer P1 including the concave portion P15 according to an ink jet method. As a result, it is possible to particularly improve the reliability of the three-dimensional structure P10 which is finally obtained.

Further, in the present embodiment, an ink P16A' for forming a first entity portion (ink for forming an insulating unit) and an ink P16B' for forming a second entity portion (ink for forming an antenna) are used as the ink P16' for forming an entity portion.

In this manner, it is possible to form a first entity portion (insulating unit) P16A as the entity portion (curing unit) P16 and to form an antenna (second entity portion, conductive portion) P16B of the RFID tag P2 in the inside of the three-dimensional structure P10. Therefore, it is possible to make the sensitivity of communication of the three-dimensional structure P10 which is finally obtained excellent even when an RFID tag without an antenna or an RFID tag having only a simple antenna is used as a RFID tag P2 for producing the three-dimensional structure P10. Further, since the shape and the size of the antenna can be adjusted according to the shape or the size of the three-dimensional structure P10, excellent communication sensitivity can be obtained without sacrificing the shape, the size, or the appearance of the three-dimensional structure P10.

In addition, the ink P16' for forming an entity portion and the ink P17' for forming a supporting portion will be described below in detail.

The amount of ink to be provided in this process is not particularly limited, but it is preferable that the thickness of the layer P1 to be formed in the curing process later is in the range of 30 μm to 500 μm and more preferable that the thickness thereof is in the range of 70 μm to 150 μm.

In this manner, it is possible to make the productivity of the three-dimensional structure P10 sufficiently excellent, to effectively prevent unintentional generation of unevenness in the three-dimensional structure P10 to be produced, and to make the dimensional precision of the three-dimensional structure P10 particularly excellent. Further, it is possible to more suitably control the surface state and the appearance of the three-dimensional structure P10 which is finally obtained.

Curing Process (Layer Forming Process)

The inks (the ink P16' for forming an entity portion and the ink P17' for forming a supporting portion) are provided (ejected) during the ink ejecting process and a curing component (curable resin) contained in the inks (the ink P16' for forming an entity portion and the ink P17' for forming a supporting portion) are cured (8B, 8D, and 9B). In this manner, the layer P1 having the entity portion P16 and the supporting portion P17 can be obtained.

In this process, since the three-dimensional structure P10 finally obtained is formed of a cured material by allowing the curing component (curable resin) contained in the ink, the mechanical strength or the durability thereof becomes excellent compared to a three-dimensional structure formed of a thermoplastic resin.

Further, in the present embodiment as described above, since the ink P16A' for forming a first entity portion (ink for forming an insulating unit) and the ink P16B' for forming a second entity portion (ink for forming an antenna) are used as the ink P16' for forming an entity portion, an insulating unit P16A and an antenna P16B of the RFID tag P2 are formed.

This process varies depending on the kind of curing component (curable resin), but, for example, the process can be performed by heating in a case where the curing component (curable resin) is a thermosetting resin and the process can be performed by irradiation with corresponding light in a case where the curing component (curable resin) is a light curable resin (for example, the process can be performed by irradiation with UV rays in a case where the curing component (curable resin) is a UV curable resin).

Further, the description is made that the ink is provided with the shape and the pattern corresponding the layer P1 and then the entire layer (layer corresponding to the layer P1) formed of the ink is cured, but, in the invention, ejecting and curing of the ink may be concurrently performed in at least a part of area. That is, before the entire patterns of one entire layer P1 are formed, a curing reaction may sequentially progress from the region for which the ink is provided in at least a part of area corresponding to the layer P1. However, the curing treatment is subjected to a contact portion between the ink P16' for forming an entity portion and the ink P17' for forming a supporting portion (for example, a portion the entity portion P16 is in contact with the supporting portion P17) at the same time (for example, irradiation with UV rays in a case where the curing component contained in both inks is a UV curable resin) and the curing treatment with respect to the ink P16' for forming an entity portion and the curing treatment with respect to the ink P17' for forming a supporting portion are not individually performed.

Further, in this process, it is not necessary to completely cure curing component contained in the ink. For example, when the process is finished, the ink P17' for forming a supporting portion may be in a state of not being completely cured and the ink P16' for forming an entity portion may be cured with a higher degree of cure than the ink P17' for forming a supporting portion.

In this manner, it is possible to easily perform a supporting portion removing process described below and to further improve the productivity of the three-dimensional structure P10.

Moreover, when the process is finished, the ink P16' for forming an entity portion may be in a state of not being completely cured. Even in this case, it is possible to make the mechanical strength or the like of the three-dimensional structure P10 finally obtained excellent by performing a main curing treatment for raising the degree of cure on the ink P16' (entity portion 16) for forming an entity portion in a state of not being completely cured after the subsequent process (for example, an "ink ejecting process" or the like after a lower layer P1 is formed during the curing process) is performed. Further, it is possible to make the adhesiveness between layers particularly excellent by providing the ink for forming an upper layer in a state in which the ink P16' for forming an entity portion (lower layer) is not completely cured.

RFID Tag Mounting Process

The RFID tag P2 is embedded in the three-dimensional structure P10 by mounting the RFID tag P2 (8E) during the layer forming process performed several times. That is, the RFID tag P2 is embedded between the layers P1 by mounting the RFID tag P2 on the layer P1 formed earlier and then forming a new layer P1.

In this manner, the three-dimensional structure P10 is obtained as a product in which the RFID tag P2 is sealed therein. As a result, it is possible to easily and reliably perform individual management of the plural three-dimensional structures P10 to be produced.

Particularly, in the present embodiment, it is possible to make the dimensional precision of the concave portion P15 excellent because the layer P1 is formed according to an ink jet method. Therefore, in this process, it is possible to easily and reliably mount the RFID tag P2 on a target region and to make the reliability of the three-dimensional structure P10 which is finally obtained particularly excellent.

Further, in the present embodiment, since the antenna (conductive portion) 16B is formed as a part of the entity portion P16, the RFID tag P2 without an antenna or only with a simple antenna can be suitably used. Since such RFID tag P2 is generally small compared to an RFID tag including an antenna sufficiently functioning, three-dimensional structures P10 having various sizes or shapes can be suitably used. Further, restriction of a region for which the RFID tag P2 is provided in the three-dimensional structure P10 is eased. Accordingly, for example, it is possible for the RFID tag P2 to be arranged in a region suitable for reading information related to the RFID tag P2. In addition, such an RFID tag P2 is generally low in price and this is advantageous from a viewpoint of reducing the cost of the three-dimensional structure P10.

By repeatedly performing the ink ejecting process and the curing process, adjacent layers P1 are bonded to each other and a laminate formed by laminating plural layers P1 in such a state, that is, a temporarily formed body P10' in which the supporting portion P17 is provided on the surface of the entity portion P16 is obtained (see 9C).

Supporting Portion Removing Process

Further, the supporting portion P17 is removed (9D) after a series of processes described above are repeatedly performed. In this manner, the three-dimensional structure P10 is obtained.

Examples of the method of removing the supporting portion P17 include a method of selectively dissolving and removing the supporting portion P17 using a liquid in which the supporting portion P17 is selectively dissolved and a method of peeling or destroying the supporting portion P17 after the supporting portion P17 is swollen or the mechanical strength of the supporting portion P17 is decreased by selectively absorbing a liquid to the supporting portion P17 using a liquid with high absorbency of the supporting portion P17 compared to that of the entity portion P16.

Examples of the liquid, which varies depending on the constituent material or the like of the entity portion P16 and the supporting portion P17, used in the process include alcohols such as water, methanol, ethanol, isopropyl alcohol, n-propyl alcohol, butanol, and isobutanol; and glycols such as glycerin, ethylene glycol, diethylene glycol, triethylene glycol, propylene glycol, and dipropylene glycol. Further, a liquid which includes one or more kinds selected from these and is obtained by mixing an aqueous substance generating hydroxide ions such as sodium hydroxide, potassium hydroxide, sodium hydrogen carbonate, and organic amine for improving solubility of the supporting portion and a surfactant for facilitating separation of the peeled supporting portion may be used.

The method of providing the liquid for the temporarily formed body P10' is not particularly limited and an immersion method, a spray method (blowing method), a coating method, and various printing methods can be employed.

Further, in the description above, a liquid is used, but a substance having the same function (for example, a solid, a gas, or a supercritical fluid) may be used.

Further, ultrasonic vibration may be provided during the liquid is provided or after the liquid is provided.

In this manner, it is possible to promote removal of the supporting portion P17 and to make the productivity of the three-dimensional structure P10 particularly excellent.

In the invention, in the state of the temporarily formed body P10', in a case where the surface state of the entity portion P16 of the three-dimensional structure P10 can be visually recognizable, the supporting portion P17 may not be removed. However, when the supporting portion P17 is removed as the case of the present embodiment, the entity portion P16 is exposed and the surface state thereof can be suitably and visually recognized by an observer.

In the description above, description is made that the ink P17' for forming a supporting portion is provided for the entire area which becomes the outermost layer of the three-dimensional structure P10 such that the area is in contact with the ink P16' for forming an entity portion P16', but the ink P17' for forming a supporting portion may be provided only for a part of an area which becomes the outermost layer of the three-dimensional structure P10 such that the area is in contact with the ink P16' for forming an entity portion.

Further, in a case where formation of the supporting portion is not necessary due to the shape or the like of the three-dimensional structure P10 to be produced, the layer P1 may be formed using the ink for forming an entity portion.

According to the production method of the invention described above, it is possible to provide a method of producing a three-dimensional structure capable of easily and reliably performing individual management of plural three-dimensional structures to be produced.

Apparatus for Producing Three-Dimensional Structure

Next, an apparatus for producing a three-dimensional structure of the invention will be described.

First Embodiment

Figure 10:
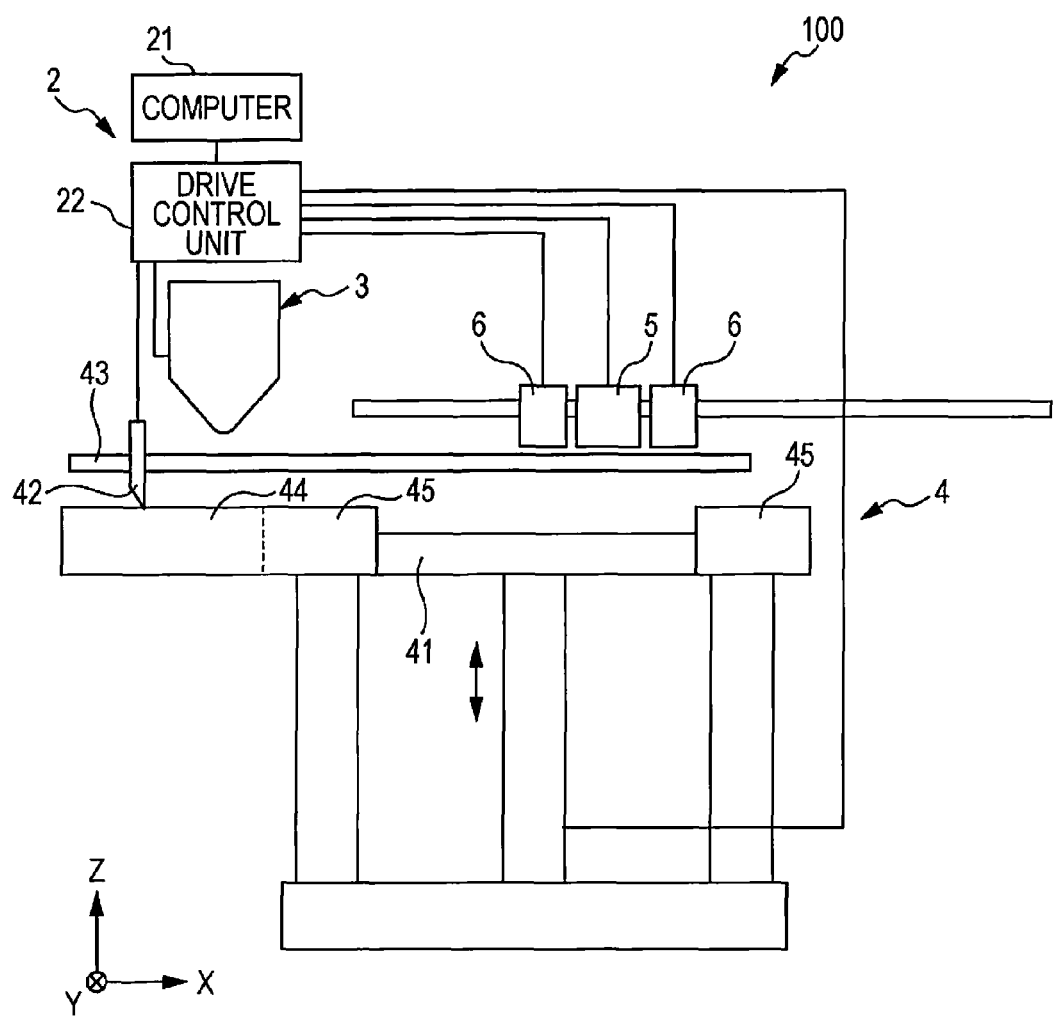
FIG. 10 is a cross-sectional view schematically illustrating an apparatus for producing a three-dimensional structure according to the first embodiment of the invention.

FIG. 10 is a cross-sectional view schematically illustrating an apparatus for producing a three-dimensional structure according to the first embodiment of the invention.

The apparatus for producing a three-dimensional structure of the invention is an apparatus for producing a three-dimensional structure which produces a three-dimensional structure by repeatedly forming layers and laminating the layers using a composition and includes a stage for which the composition is provided and on which the layer is formed; and an RFID tag mounting unit that mounts an RFID tag on the layer.

In this manner, it is possible to provide the apparatus for producing a three-dimensional structure capable of easily and reliably performing individual management of plural three-dimensional structures to be produced.

Particularly, an apparatus 100 for producing a three-dimensional structure illustrated in FIG. 10 produces the three-dimensional structure P10 by repeatedly forming layers P1 and laminating the layers using a composition (composition for three-dimensional forming) P11 containing grains P111.

As illustrated in FIG. 10, the apparatus 100 for producing a three-dimensional structure includes a control unit 2; a composition supply unit 3 that accommodates the composition P11 containing the grains P111; a layer forming unit 4 that forms the layer P1 using the composition P11 supplied from the composition supply unit 3; a binding solution ejecting unit (binding solution providing unit) 5 that ejects the binding solution P12 to the layer P1; an energy ray irradiation unit (curing unit) 6 that irradiates with energy rays for curing the binding solution P12; an RFID tag mounting unit (not illustrated) that mounts the REID tag P2; an information writing unit (not illustrated) that writes identification information related to the three-dimensional structure P10 in the RFID tag P2; and an information reading unit (not illustrated) that reads the identification information related to the three-dimensional structure P10 written in the RFID tag P2.

The control unit 2 includes a computer 21 and a drive control unit 22.

The computer 21 is a general tabletop computer including a CPU or a memory in the inside thereof. The computer 21 makes the shape of the three-dimensional structure P10 into data as model data and outputs cross-section data (slice data) obtained by slicing the data into a thin cross-section body formed of several layers in parallel to a drive control unit 22.

The drive control unit 22 functions as a control unit that controls each of the layer forming unit 4, the binding solution ejecting unit 5, the energy ray irradiation unit 6, and the RFID mounting unit. Specifically, the drive control unit 22 controls an ejecting pattern or an ejecting amount of the binding solution P12 using the binding solution ejecting unit 5; a supply amount of the composition P11 supplied from the composition supply unit 3; and a descent amount of the stage 41.

The composition supply unit 3 moves according to an instruction from the drive control unit 22 and is configured such that the composition P11 accommodated therein is supplied to the composition temporary placing portion 44.

The layer forming unit 4 includes the composition temporary placing portion 44 temporarily holding the composition P11 supplied from the composition supply unit 3; the squeegee (flattening unit) 42 flattening the composition P11 held by the composition temporary placing portion 44 and forming the layer P1; a guide rail 43 restricting an operation of the squeegee 42; a stage 41 supporting the formed layer P1; and a side surface supporting portion (frame) 45 surrounding the stage 41.

A layer P1 formed earlier is moved to the relatively lower side with respect to the side surface supporting portion 45 when the new layer P1 is formed on the layer P1 formed earlier. In this manner, the thickness of the layer P1 newly formed is restricted.

Particularly, in the present embodiment, the stage 41 sequentially descends by a predetermined amount according to an instruction from the drive control unit 22 when a new layer P1 is formed on the layer P1 formed earlier. In this manner, when the stage 41 is configured so as to be movable in a Z direction (the vertical direction, the lamination direction of layers), during the formation of a new layer P1, since the number of members to be moved in order to adjust the thickness of the layer P1 can be reduced, the configuration of the apparatus 100 for producing a three-dimensional structure can be made simpler.

The stage 41 has a flat surface (region for which the composition P11 is provided).

In this manner, it is possible to easily and reliably form a layer P1 whose thickness is highly uniform. Further, it is possible to effectively prevent the generation of unintentional deformation or the like in the three-dimensional structure P10 to be produced.

It is preferable that the stage 41 is formed of a material with high strength. As the constituent material of the stage 41, for example, various metal materials such as stainless steel or the like can be exemplified.

In addition, the surface (region for which the composition P11 is provided) of the stage 41 may be subjected to a surface treatment. In this manner, it is possible to prevent the constituent material of the composition P11 or the constituent material of the binding solution P12 from being adhered to the stage 41, to make the durability of the stage 41 particularly excellent, and to achieve stable production of the three-dimensional structure P10 for a longer period of time. As the material used in the surface treatment applied to the surface of the stage 41, for example, a fluorine resin such as polytetrafluoroethylene can be exemplified.

The squeegee 42 has a longitudinal shape extending in a Y direction and includes a blade having a shape of a blade whose tip in the lower portion is pointed.

The length of the blade in the Y direction is greater than or equal to the width (length in the Y direction) of the stage 41 (forming area).

Further, the apparatus 100 for producing a three-dimensional structure may include a vibration mechanism (not illustrated) that provides minute vibration for the blade such that diffusion of the composition P11 is smoothly performed by the squeegee 42.

The side surface supporting portion 45 has a function of supporting the side surface of the layer P1 formed on the stage 41. Moreover, the side surface supporting portion 45 also has a function of restricting the area of the layer P1 at the time of forming the layer P1.

In addition, the surface (region which may come into contact with the composition P11) of the side surface supporting portion 45 may be subjected to the surface treatment. In this manner, it is possible to effectively prevent the constituent material of the composition P11 or the constituent material of the binding solution P12 from being adhered to the side surface supporting portion 45, to make the durability of the side surface supporting portion 45 particularly excellent, and to achieve stable production of the three-dimensional structure P10 for a longer period of time. Further, when the layer P1 formed earlier is moved relatively lower side with respect to the side surface supporting portion 45, it is possible to effectively prevent the generation of unintentional disturbance in the layer P1. As a result, it is possible to make the dimensional precision or the reliability of the three-dimensional structure P10 which is finally obtained particularly excellent. As the material used in the surface treatment applied to the surface of the side surface supporting portion 45, for example, a fluorine resin such as polytetrafluoroethylene is exemplified.

The binding solution providing unit (binding solution ejecting unit) 5 provides the binding solution P12 for the layer P1.

By including such a binding solution providing unit 5, it is possible to easily and reliably make the mechanical strength of the three-dimensional structure P10 excellent.

Particularly, in the present embodiment, the binding solution providing unit 5 is a binding solution ejecting unit that ejects the binding solution P12 according to an ink jet method.

In this manner, it is possible to provide the binding solution P12 in a fine pattern and to produce the three-dimensional structure P10 having a fine structure with particularly excellent productivity.

As a droplet ejecting system (system of an ink jet method), a piezo system or a system of ejecting the binding solution P12 using bubbles generated by heating the binding solution P12 can be used, but a piezo system is preferable from a viewpoint of difficulty in changing the quality of a constituent component of the binding solution P12.

In the binding solution ejecting unit (binding solution proving unit) 5, the pattern to be formed in each layer P1 and the amount of the binding solution P12 provided for each unit of the layer P1 are controlled according to an instruction from the drive control unit 22. The ejection pattern or the ejection amount of the binding solution P12 with the binding solution ejecting unit (binding solution providing unit) 5 is determined based on the slice data.

The energy ray irradiation unit (curing unit) 6 irradiates with energy rays for curing the binding solution P12 provided for the layer P1.

The kind of energy rays applied by the energy ray irradiation unit 6 varies according to the constituent material of the binding solution P12, and examples thereof include UV rays, visible light, infrared rays, X-rays, g-rays, electron beams, and ion beams. Among these, it is preferable to use UV rays from a viewpoint of the cost and the productivity of the three-dimensional structure.

The RFID tag mounting unit has a function of mounting the RFID tag P2 on the layer P1.

As the RFID tag mounting unit, it is possible to use various handlers.

Further, the apparatus 100 for producing a three-dimensional structure of the present embodiment includes an information writing unit (not illustrated) that writes identification information related to the three-dimensional structure P10 in the RFID tag P2.

In this manner, since it is not necessary to prepare the RFID tag P2 in which the identification information related to the three-dimensional structure P10 is written, it is possible to suitably respond to the change of the specification of the three-dimensional structure P10 to be produced. Further, it is possible to reduce the probability of using the RFI tag P2 in which information different from the identification information related to the three-dimensional structure P10 to be produced is written.

Further, the apparatus 100 for producing a three-dimensional structure of the present embodiment includes an information reading unit (not illustrated) that reads the identification information related to the three-dimensional structure P10 written in the RFID tag P2.

In this manner, it is possible to confirm the identification information related to the three-dimensional structure P10 written in the RFID tag P2 before the RFID tag P2 is mounted on the layer P1 and to reduce the probability of using the RFI tag P2 in which information different from the identification information related to the three-dimensional structure P10 to be produced is written.

Second Embodiment

Next, an apparatus for producing a three-dimensional structure according to the second embodiment of the invention will be described.

Figure 11:
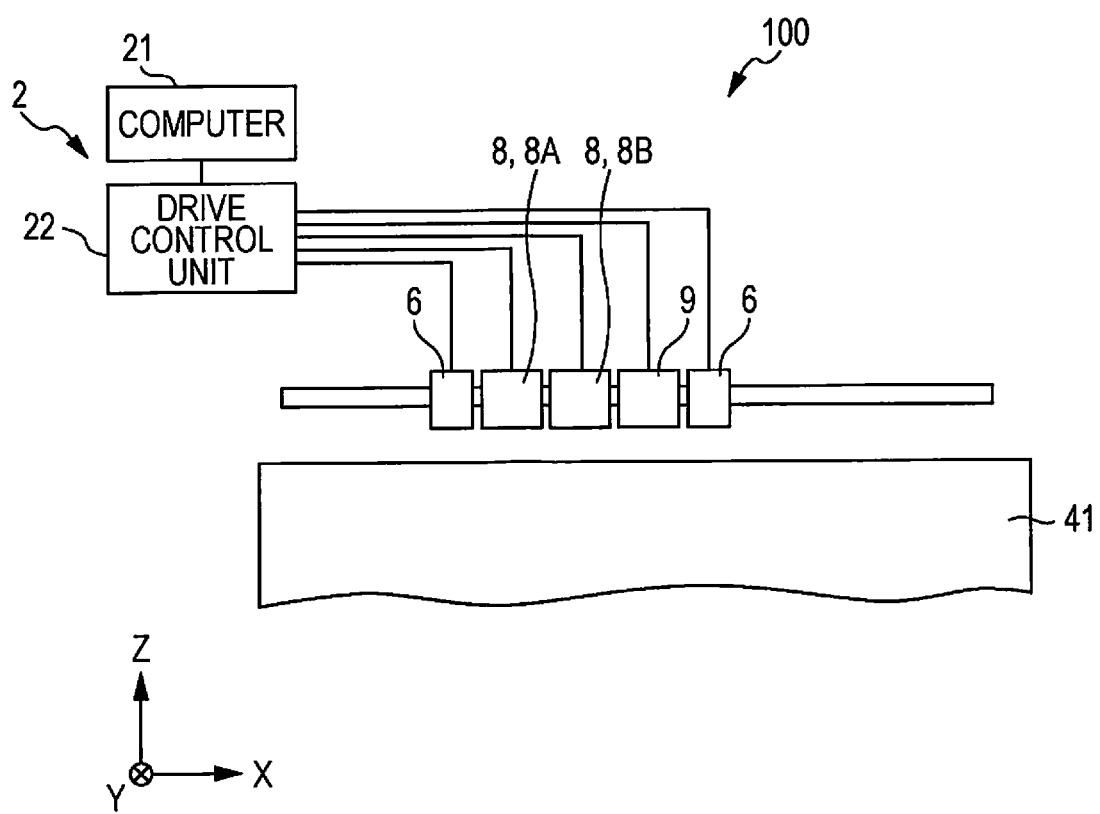
FIG. 11 is a cross-sectional view schematically illustrating an apparatus for producing a three-dimensional structure according to the second embodiment of the invention.

FIG. 11 is a cross-sectional view schematically illustrating the apparatus for producing a three-dimensional structure according to the second embodiment of the invention. In the description below, differences from the above-described embodiment will be mainly described and the same description will not be repeated.

An apparatus 100 for producing a three-dimensional structure produces a three-dimensional structure P10 by repeatedly forming and laminating layers P1 using an ink P16' for forming an entity portion and an ink P17' for forming a supporting portion.

As illustrated in FIG. 11, the apparatus 100 for producing a three-dimensional structure includes a control unit 2; a stage 41; an ink providing unit 8 for forming an entity portion that ejects the ink P16' for forming an entity portion; an ink providing unit 9 for forming a supporting portion that ejects the ink P17' for forming a supporting portion; an energy ray irradiation unit (curing unit) 6 that irradiates with energy rays for curing the ink P16' for forming an entity portion and the ink P17' for forming a supporting portion; an RFID tag mounting unit (not illustrated) that mounts the RFID tag P2; an information writing unit (not illustrated) that writes identification information related to the three-dimensional structure P10 in the RFID tag P2; and an information reading unit (not illustrated) that reads the identification information related to the three-dimensional structure P10 written in the RFID tag P2.

The ink providing unit 8 ejects the ink P16' for forming an entity portion according to an ink jet method.

By including such an ink providing unit 8 for forming an entity portion, it is possible to provide the ink P16' for forming an entity portion for a desirable region by a desirable amount in a fine pattern and to produce the three-dimensional structure P10 having a fine structure with particularly excellent productivity.

As a droplet ejecting system (system of an ink jet method), a piezo system or a system of ejecting the ink using bubbles generated by heating the ink can be used, but a piezo system is preferable from a viewpoint of difficulty in changing the quality of a constituent component of the ink.

In the ink providing unit 8 for forming an entity portion, the pattern to be formed and the amount of the ink P16' for forming an entity portion to be provided are controlled according to an instruction from the drive control unit 22. The ejection pattern or the ejection amount of the ink P16' for forming an entity portion by the ink providing unit 8 for forming an entity portion is determined based on the slice data.

In this manner, it is possible to provide a sufficient amount of ink P16' for forming an entity portion for a target region, to reliably form an entity portion P16 in a desirable pattern, and to make the dimensional precision or the mechanical strength of the three-dimensional structure P10 more reliably excellent. Further, in a case where the ink P16' for forming an entity portion includes a colorant, it is possible to reliably obtain a desired color tone or figure.

The ink providing unit 8 for forming an entity portion is relatively movable in the X direction or in the Y direction with respect to the stage and is also movable in the Z direction.

In this manner, even when the layers P1 are laminated, it is possible to maintain the distance between the surface of a nozzle (tip of an ejecting unit) of the ink providing unit 8 for forming an entity portion and the ink P16' for forming an entity portion at a predetermined value.

Moreover, the apparatus 100 for producing a three-dimensional structure of the present embodiment includes an ink providing unit 8A for forming an entity portion that provides an ink P16A' for forming a first entity portion (ink for forming an insulating unit) and an ink providing unit 8B for forming an entity portion that provides an ink P16B' for forming a second entity portion (ink for forming an antenna), as the ink providing unit 8 for forming an entity portion.

In this manner, it is possible to suitably produce the three-dimensional structure P10 including an antenna P163 as illustrated in FIGS. 9A to 9D.

The ink providing unit 9 for forming a supporting portion ejects the ink P17' for forming a supporting portion according to an ink jet method.

By including such an ink providing unit 9 for forming a supporting portion, it is possible to provide the ink P17' for forming a supporting portion for a desirable region by a desirable amount in a fine pattern, to form a supporting portion P17 with a desirable size or a shape in a desirable region even when the three-dimensional structure P10 to be produced has a fine structure, and to more reliably form the surface shape or the appearance of the three-dimensional structure P10. Moreover, it is possible to make the productivity of the three-dimensional structure P10 particularly excellent.

The droplet ejecting system (system of an ink jet method), the control, or the drive of the ink providing unit 9 for forming a supporting portion is the same as that of the ink providing unit 8 for forming an entity portion described above.

Moreover, although not illustrated in the figures, the apparatus 100 for producing a three-dimensional structure may include a supporting portion removing unit that removes the supporting portion P17 and a drying unit that dries the three-dimensional structure P10 from which the supporting portion P17 is removed.

Examples of the supporting portion removing unit include a unit that mechanically destroys or removes the supporting portion P17; a bath that accommodates a liquid as described above and immerses a temporarily formed body P10' in the liquid; a liquid spray unit that sprays the liquid described above toward the temporarily formed body P10'; and a liquid coating unit that coats the temporarily formed body P10' with the liquid described above.

Examples of the drying unit include a unit that supplies heated gas or dried gas as described above and a pressure reducing unit that reduces the pressure of the space in which the three-dimensional structure P10 is accommodated.

Further, the apparatus for producing the three-dimensional structure of the invention may perform at least some of the processes described above and some of the processes described above may be performed without using the apparatus for producing a three-dimensional structure.

According to the apparatus for producing a three-dimensional structure of the invention described above, it is possible to easily and reliably perform individual management of plural three-dimensional structures to be produced.

Composition (Composition for Three-Dimensional Forming)

Next, the composition used for producing a three-dimensional structure (composition for three-dimensional forming) of the invention will be described in detail.

First Embodiment

First, the composition P11 containing grains P111 described in the first embodiment and the second embodiment of the production method of the invention and the first embodiment of the apparatus for producing a three-dimensional structure of the invention will be described.

Figure 12:
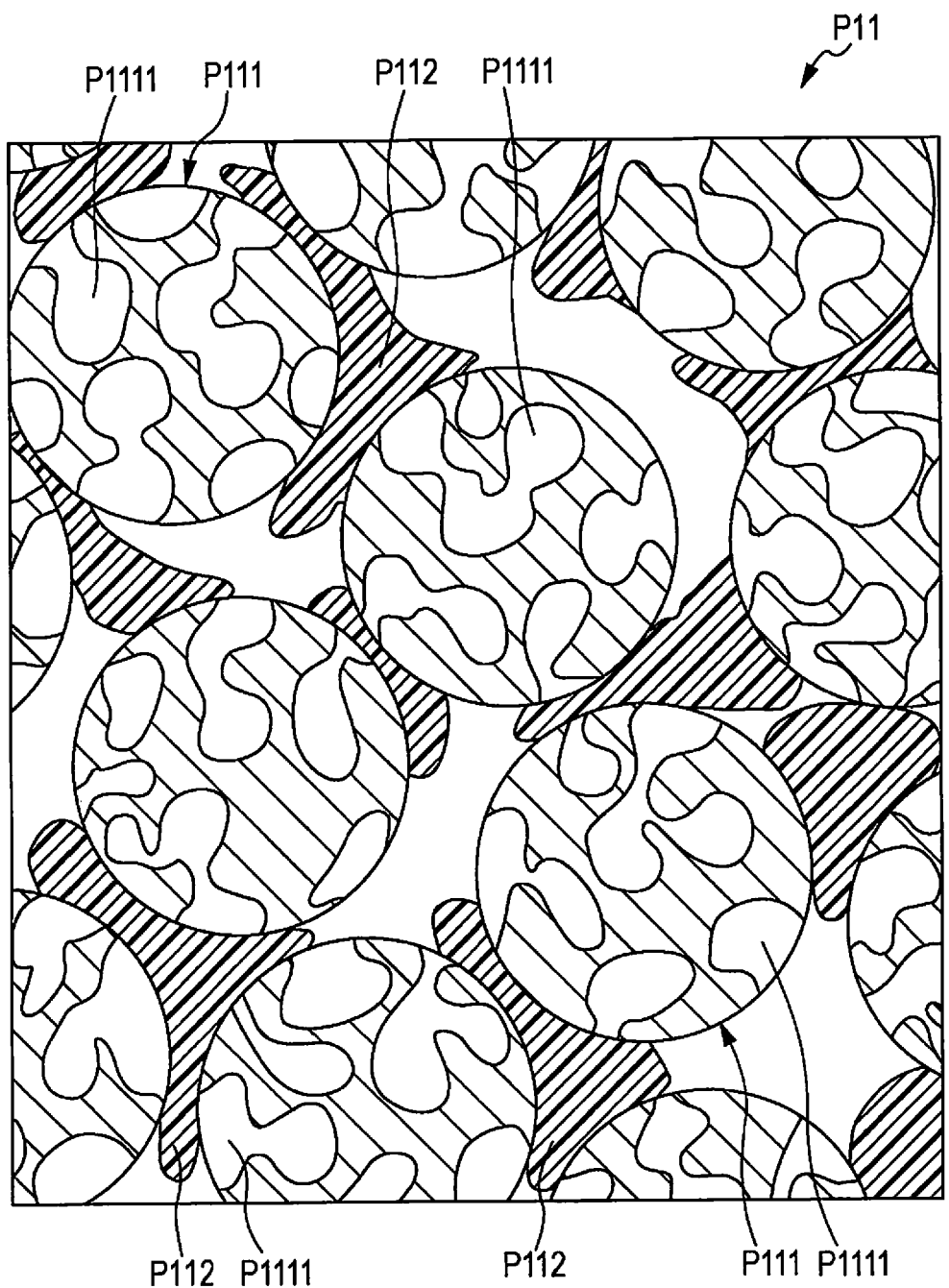
FIG. 12 is a cross-sectional view schematically illustrating a state in a layer (composition for three-dimensional forming) before a binding solution providing process.
Figure 13:
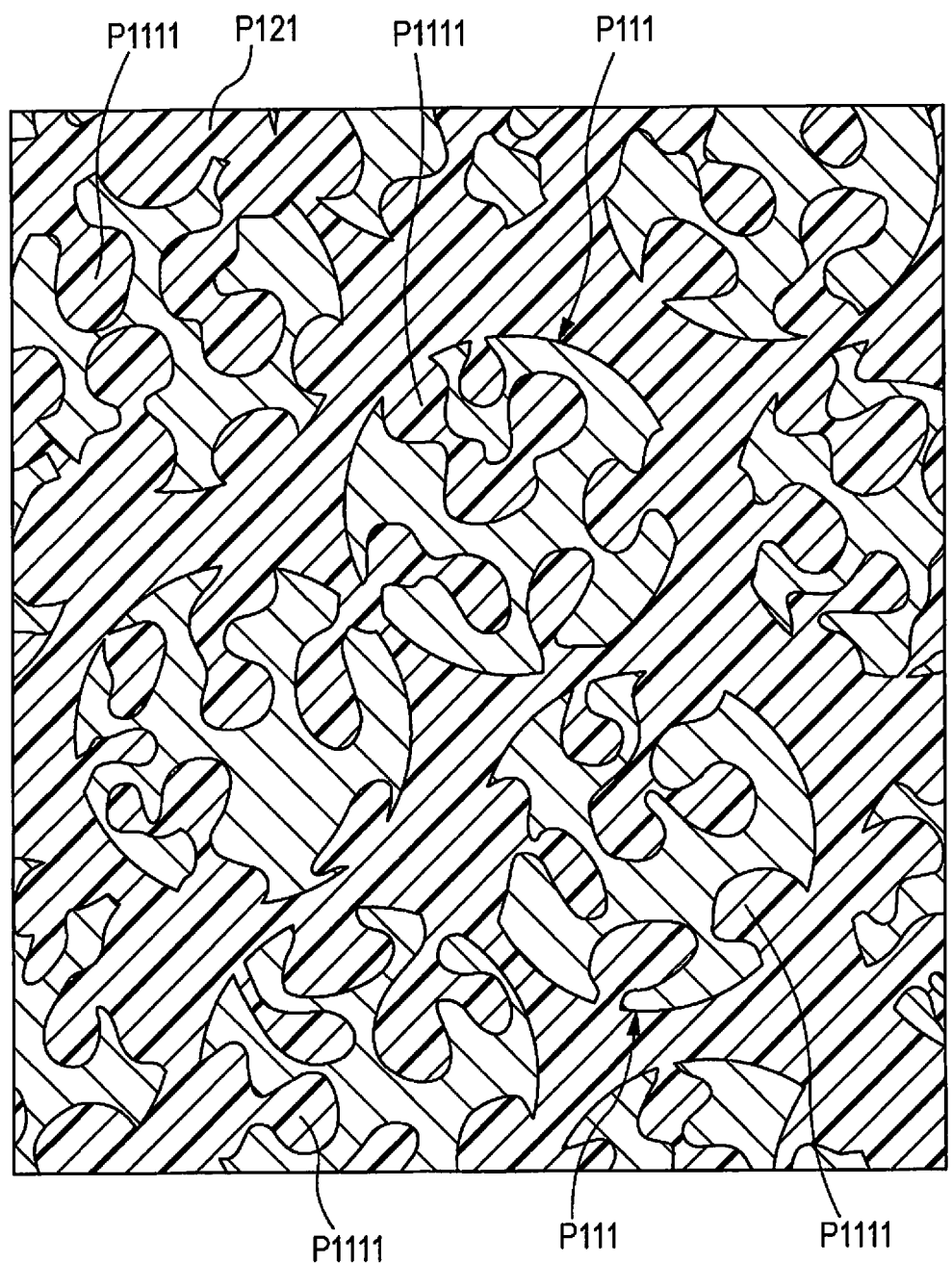
FIG. 13 is a cross-sectional view schematically illustrating a state in which grains are bonded together with a hydrophobic binder.

FIG. 12 is a cross-sectional view schematically illustrating a state in a layer (composition for the three-dimensional forming) before the binding solution providing process is performed and FIG. 13 is a cross-sectional view schematically illustrating a state in which grains are bonded together with a hydrophobic binder.

The composition (composition for three-dimensional forming) P11 includes at least powder for three-dimensional forming which contains plural grains P111.

Powder for Three-Dimensional Forming (Grains P111)

It is preferable that the grains P111 constituting powder for three-dimensional forming are porous and are subjected to a hydrophobic treatment. With such a configuration, in a case where a binding solution P12 includes a hydrophobic binder P121, it is possible for the hydrophobic binder P121 to suitably infiltrate into pores P1111 and thus an anchor effect is exhibited when the three-dimensional structure P10 is produced. As a result, it is possible to make the bonding force (bonding force through the binder P121) among the grains P111 excellent, and accordingly, it is possible to suitably produce the three-dimensional structure P10 with excellent mechanical strength (see FIG. 13). Further, such powder for three-dimensional forming can be suitably reused. More specifically, since a water-soluble resin P112 described below is prevented from entering the pores P1111 when the grains P111 constituting the powder for three-dimensional forming is subjected to a hydrophobic treatment, the grains P111 in an area for which the binding solution P12 is not provided in the production of the three-dimensional structure P10 can be recovered with a small content ratio of impurities and with high purity by washing the grains P111 with water or the like. Therefore, it is possible to obtain the composition for three-dimensional forming controlled to have a desired composition by mixing the recovered powder for three-dimensional forming with the water-soluble resin P112 or the like again with a predetermined ratio. Further, it is possible to effectively prevent unintentional wet spreading of the binding solution P12 with the binder P121 constituting the binding solution P12 entering the pores P1111 of the grains P111. As a result, it is possible to further improve the dimensional precision of the three-dimensional structure P10 which is finally obtained.

Examples of the constituent material of the grains P111 constituting the powder for three-dimensional forming (mother particles to which a hydrophobic treatment is applied) include inorganic materials, organic materials, and complexes thereof.

Examples of the inorganic materials constituting the grains P111 include various metals or metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such zinc sulfide; carbonate of various metals such as calcium carbonate and magnesium carbonate; sulfate of various metals such as calcium sulfate and magnesium sulfate; silicate of various metals such as calcium silicate and magnesium silicate; phosphate of various metals such as calcium phosphate; borate of various metals such as aluminum borate and magnesium borate; and complexes of these.

Examples of the organic materials constituting the grains P111 include a synthetic resin and a natural polymer. Further, specific examples thereof include a polyethylene resin; polypropylene; polyethylene oxide; polypropylene oxide; polyethylenimine; polystyrene; polyurethane; polyurea; polyester; a silicone resin; an acrylic silicone resin; a polymer using (meth)acrylic acid ester such as polymethylmethacrylate as a constituent monomer; a cross polymer (ethylene acrylic acid copolymer resin or the like) using (meth)acrylic acid ester such as a methyl methacrylate cross polymer as a constituent monomer; a polyamide resin such as Nylon 12, Nylon 6, or copolymer nylon; polyimide; carboxymethyl cellulose; gelatin; starch; chitin; and chitosan.

Among these, the grains P111 is formed of preferably an inorganic material, more preferably a metal oxide, and still more preferably silica. In this manner, it is possible to make properties such as the mechanical strength and heat resistance of the three-dimensional structure P10 particularly excellent. Further, particularly, when the grains P111 are formed of silica, the above-described effects are better exhibited. Moreover, since silica has excellent fluidity, silica is advantageous for forming the layer P1 having higher uniformity in thickness and also advantageous for making the productivity and the dimensional precision of the three-dimensional structure P10 particularly excellent.

As the hydrophobic treatment applied to the grains P111 constituting the powder for three-dimensional forming, any treatment can be performed as long as the treatment increases hydrophobicity of the grains P111 (mother particles), but a treatment of introducing a hydrocarbon group is preferable. In this manner, it is possible to increase the hydrophobicity of the grains P111. Further, it is possible to easily and reliably increase the uniformity of the hydrophobic treatment in each grain P111 or in each region of the surface of grains P111 (including the surface in the inside of the pores P1111).

As the compound used for the hydrophobic treatment, a silane compound including a silica group is preferable. Specific examples of the compound which can be used for the hydrophobic treatment include hexamethyl disilazane, dimethyl dimethoxy silane, diethyl diethoxy silane, 1-propenyl-methyldichlorosilane, propyl dimethyl chlorosilane, propyl methyl dichlorosilane, propyl trichlorosilane, propyl triethoxy silane, propyl trimethoxy silane, styryl ethyl trimethoxysilane, tetradecyl trichlorosilane, 3-thiocyanate propyl triethoxysilane, p-tolyl dimethyl chlorosilane, p-tolyl methyl dichlorosilane, p-tolyl trichlorosilane, p-tolyl trimethoxysilane, p-tolyl triethoxysilane, di-n-propyldi-propoxysilane, diisopropyl diisopropoxysilane, di-n-butyldi-n-butyloxysilane, di-sec-butyldi-sec-butyloxysilane, di-t-butyldi-t-butyloxysilane, octadecyl trichlorosilane, octadecyl methyl diethoxysilane, octadecyl triethoxysilane, octadecyl trimethoxysilane, octadecyl dimethyl chlorosilane, octadecyl methyl dichlorosilane, octadecyl methoxy dichlorosilane, 7-octenyl dimethyl chlorosilane, 7-octenyl trichlorosilane, 7-octenyl trimethoxysilane, octyl methyl dichlorosilane, octyl dimethyl chlorosilane, octyl trichlorosilane, 10-undecenyl dimethyl chlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxysilane, n-octyl methyl dimethoxysilane, n-octyl methyl diethoxysilane, triacontyl dimethyl chlorosilane, triacontyl trichlorosilane, methyl trimethoxysilane, methyl triethoxysilane, methyl tri-n-propoxysilane, methyl isopropoxysilane, methyl-n-butyloxysilane, methyl tri-sec-butyloxysilane, methyl tri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxysilane, hexadecyl trimethoxysilane, n-octyl trimethoxysilane, n-dodecyl trimethoxysilane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane, 1,3-(trichlorosilylmethyl) hetacosane, dibenzyl dimethoxysilane, dibenzyl diethoxysilane, phenyl trimethoxysilane, phenyl methyl dimethoxysilane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxysilane, benzyl dimethyl methoxysilane, benzyl dimethoxysilane, benzyl dimethyl ethoxysilane, benzyl methyl diethoxysilane, benzyl methyl ethoxysilane, benzyl triethoxysilane, dibenzyl dimethoxysilane, dibenzyl diethoxysilane, 3-acetoxy propyl trimethoxysilane, 3-acryloxy propyl trimethoxysilane, aryl trimethoxysilane, aryl triethoxysilane, 4-aminobutyl triethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, 6-(aminohexylaminopropyl)trimethoxysilane, p-aminophenyl trimethoxysilane, p-aminophenyl ethoxysilane, m-aminophenyl trimethoxysilane, m-aminophenyl ethoxysilane, 3-aminopropyl trimethoxysilane, 3-aminopropyl triethoxysilane, ω-aminoundecyl trimethoxysilane, aminotriethoxysilane, benzooxathiepine dimethyl ester, 5-(bicycleheptenyl) triethoxysilane, bis(2-hydroxyethyl)-3-aminopropyltriethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl)phenyltrimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonylphenyl)ethyltrimethoxysilane, 2-cyanoethyl triethoxysilane, 2-cyanoethyl trimethoxysilane, cyanomethyl phenetyl triethoxysilane, 3-cyanopropyl triethoxysilane, 2-(3-cyclohexenyl)ethyltrimethoxysilane, 2-(3-cyclohexenyl)ethyltriethoxysilane, 3-cyclohexenyl trichlorosilane, 2-(3-cyclohexenyl)ethyltrichlorosilane, 2-(3-cyclohexenyl)ethyldimethylchlorosilane, 2-(3-cyclohexenyl)ethylmethyldichlorosilane, cyclohexyl dimethyl chlorosilane, cyclohexyl ethyl dimethoxysilane, cyclohexyl methy dichlorosilane, cyclohexyl methyl dimethoxysilane, (cyclohexylmethyl)trichlorosilane, cyclohexyl trichlorosilane, cyclohexyl trimethoxysilane, cyclooctyl trichlorosilane, (4-cyclooctenyl)trichlorosilane, cyclopentyl trichlorosilane, cyclopentyl trimethoxysilane, 1,1-diethoxy-1-silacyclopenta-3-ene, 3-(2,4-dinitrophenylamino)propyltriethoxysilane, (dimethylchlorosilyl)methyl-7,7-dimethylnopinane, (cyclohexylaminomethyl)methyldiethoxysilane, (3-cyclopentadienylpropyl)triethoxysilane, N,N-diethyl-3-aminopropyltrimethoxysilane, 2-(3,4-epoxycyclohexyl)ethyltrimethoxysilane, 2-(3,4-epoxysilanecyclohexyl)ethyltrimethoxysilane, (furfuryl oxymethyl)triethoxysilane, 2-hydroxy-4-(3-triethoxypropoxy)diphenylketone, 3-(p-methoxyphenyl)propylmethyldichlorosilane, 3-(p-methoxyphenyl)propyltrichlorosilane, p-(methylphenethyl)methyldichlorosilane, p-(methylphenethyl)trichlorosilane, p-(methylphenetyl)dimethylchlorosilane, 3-morpholino propyl trimethoxysilane, (3-glycidoxypropyl)methyldiethoxysilane, 3-glycidoxypropyltrimethoxysilane, 1,2,3,4,7,7-hexachloro-6-methyldiethoxysilyl-2-norbornen, 1,2,3,4,7,7-hexachloro-6-triethoxysilyl-2-norbornene, 3-iodopropyl trimethoxysilane, 3-isocyanate propyl triethoxysilane, (mercaptomethyl)methyldiethoxysilane, 3-mercaptopropylmethyldimethoxysilane, 3-mercaptopropyl dimethoxysilane, 3-mercaptopropyl triethoxysilane, 3-methacryloxypropyl methyldiethoxysilane, 3-methacryloxypropyl trimethoxysilane, methyl{2-(3-trimethoxysilylpropylamino)ethylamino}-3-propionate, 7-octenyltrimethoxysilane, R—N-α-phenethyl-N'-triethoxysilylpropylurea, S—N-α-phenethyl-N'-triethoxysilylpropylurea, phenethyl trimethoxysilane, phenethyl methyl dimethoxysilane, phenethyl dimethyl methoxysilane, phenethyl dimethoxysilane, phenethyl diethoxysilane, phenethyl methyl diethoxysilane, phenethyl dimethyl ethoxysilane, phenethyl triethoxysilane, (3-phenylpropyl)dimethylchlorosilane, (3-phenylpropyl)methyldichlorosilane, N-phenylaminopropyl trimethoxysilane, N-(triethoxysilylpropyl)dansylamide, N-(3-triethoxysilylpropyl)-4,5-dihydroimidazole, 2-(triethoxysilylethyl)-5-(chloroacetoxy)bicycloheptane, (S)—N-triethoxysilylpropyl-O-methyl carbamate, 3-(triethoxysilylpropyl)-p-nitrobenzamide, 3-(triethoxysilyl)propyl succinic anhydride, N-[5-(trimethoxysilyl)-2-aza-1-oxo-pentyl]caprolactone, 2-(trimethoxysilylethyl)pyridine, N-(trimethoxysilylethyl) benzyl-N,N,N-trimethyl ammonium chloride, phenyl vinyl diethoxysilane, 3-thiocyanate propyl triethoxysilane, (tridecafluoro-1,1,2,2-tetrahydrooctyl)triethoxysilane, N-{3-(triethoxysilyl)propyl}phthaamic acid, (3,3,3-trifluoropropyl) methyl dimethoxysilane, (3,3,3-trifluoropropyl) trimethoxysilane, 1-trimethoxysilyl-2-(chloromethyl) phenylethane, 2-(trimethoxysilyl)ethylphenylsulfonylamide, β-trimethoxysilylethyl-2-pyridine, trimethoxy silylpropyl diethylene triamine, N-(3-trimethoxysilylpropyl)pyrrole, N-trimethoxysilylpropyl-N, N, N-tributylammoniumbromide, N-trimethoxysilylpropyl-N,N,N-tributylammoniumchloride, N-trimethoxysilylpropyl-N,N,N-trimethylammoniumchloride, vinyl methyl diethoxysilane, vinyl triethoxysilane, vinyl trimethoxysilane, vinyl methyl dimethoxysilane, vinyl methyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl triphenoxysilane, vinyl tris-t-butoxysilane, adamantly ethyl trichlorosilane, aryl phenyl trichlorosilane, (aminoethylaminomethyl)phenethyltrimethoxysilane, 3-aminophenoxy dimethyl vinylsilane, phenyl trichlorosilane, phenyl dimethyl chlorosilane, phenyl methyl dichlorosilane, benzyl trichlorosilane, benzyl dimethyl chlorosilane, benzyl methyl dichlorosilane, phenethyl diisopropyl chlorosilane, phenethyl trichlorosilane, phenethyl dimethyl chlorosilane, phenethyl methyl dichlorosilane, 5-(bicycloheptenyl)trichlorosilane, 5-(bicycloheptenyl)triethoxysilane, 2-(bicycloheptyl)dimethylchlorosilane, 2-(bicycloheptyl)trichlorosilane, 1,4-bis(trimethoxysilylethyl)benzyl, bromophenyl trichlorosilane, 3-phenoxypropyl dimethylchlorosilane, 3-phenoxypropyl trichlorosilane, t-butylphenyl chlorosilane, t-butylphenyl methoxysilane, t-butylphenyl dichlorosilane, p-(t-butyl) phenethyldimethylchlorosilane, p-(t-butyl)phenethyltrichlorosilane, 1,3-(chlorodimethylsilylmethyl)heptacosane, ((chloromethyl)phenylethyl)dimethylchlorosilane, ((chloromethyl)phenylethyl)methyldichlorosilane, ((chloromethyl)phenylethyl)trichlorosilane, ((chloromethyl)phenylethyl)trimethoxysilane, chlorophenyl trichlorosilane, 2-cyanoethyl trichlorosilane, 2-cyanoethyl methyl dichlorosilane, 3-cyanopropyl methyl diethoxysilane, 3-cyanopropyl methyl dichlorosilane, 3-cyanopropyl methyl dichlorosilane, 3-cyanopropyl dimethyl ethoxysilane, 3-cyanopropyl methyl dichlorosilane, 3-cyanopropyl trichlorosilane, and fluorinated alkylsilane, and these can be used alone or in combination of two or more kinds thereof.

Among these, it is preferable to use hexamethyl disilazane for a hydrophobic treatment. In this manner, it is possible to increase the hydrophobicity of the grain P111. Further, it is possible to easily and reliably increase the uniformity of the hydrophobic treatment in each grain P111 or in each region of the surface of grains P111 (including the surface in the inside of the pores P1111).

In a case where the hydrophobic treatment using a silane compound in a liquid phase, it is possible to suitably promote a desirable reaction and to form a chemical adsorption film of a silane compound by immersing the grains P111 (mother particles) to which the hydrophobic treatment is applied in a liquid containing a silane compound.

In a case where the hydrophobic treatment using a silane compound in a vapor phase, it is possible to suitably promote a desirable reaction and to form a chemical adsorption film of a silane compound by exposing the grains P111 (mother particles) to which the hydrophobic treatment is applied to steam of a silane compound.

The average particle diameter of the grains P111 constituting the powder for three-dimensional forming, which is not particularly limited, is preferably in the range of 1 μm to 25 μm and more preferably in the range of 1 μm to 15 μm. In this manner, it is possible to make the mechanical strength of the three-dimensional structure P10 particularly excellent, to more effectively prevent the generation of unintentional unevenness in the three-dimensional structure P10 to be produced, and to make the dimensional precision of the three-dimensional structure P10 particularly excellent. Further, it is possible to make the fluidity of the powder for three-dimensional forming and the fluidity of the composition (composition for three-dimensional forming) P11 including the powder for three-dimensional forming particularly excellent and to make the productivity of the three-dimensional forming product P10 particularly excellent.

Moreover, in the invention, the average particle diameter means the average particle diameter on the volume basis and can be acquired by adding a sample to methanol and measuring a dispersion liquid, in which the sample is dispersed by an ultrasonic disperser for 3 minutes, with a particle size distribution measuring device (TA-II type, manufactured by COULTER ELECTRONICS, Inc.) according to a coulter counter method using an aperture having a diameter of 50 µm.

Dmax of the grains P111 constituting the powder for three-dimensional forming is preferably in the range of 3 µm to 40 µm and more preferably in the range of 5 µm to 30 µm. In this manner, it is possible to make the mechanical strength of the three-dimensional structure P10 particularly excellent, to more effectively prevent the generation of unintentional unevenness in the three-dimensional structure P10 to be produced, and to make the dimensional precision of the three-dimensional structure P10 particularly excellent. Further, it is possible to make the fluidity of the powder for three-dimensional forming and the fluidity of the composition (composition for three-dimensional forming) P11 including the powder for three-dimensional forming particularly excellent and to make the productivity of the three-dimensional forming product P10 particularly excellent.

The porosity of the powder P111 constituting the powder for three-dimensional forming is preferably 50% or more and more preferably in the range of 55% to 90%. In this manner, it is possible to sufficiently have a space (pores P1111) for which the binder P121 enters, to make the mechanical strength of the grains P111 excellent, and to make the mechanical strength of the three-dimensional structure P10 formed with the binder P121 infiltrating into the pores P1111 particularly excellent. Further, in the invention, the porosity of the grains (particles) means the ratio (volume ratio) of the pores present in the inside of the grains with respect to the apparent volume of the grains and is a value represented by "$\{(\rho 0-\rho)\}/\rho 0\} \times 100$" when the density of the grains is set as $\rho [g/cm^3]$ and the true density of the constituent material of the grains is set as $\rho 0 [g/cm^3]$.

The average pore diameter (pore diameter) of the grains P111 is preferably 10 nm or more and more preferably in the range of 50 nm to 300 nm. In this manner, it is possible to make the mechanical strength of the three-dimensional structure P10 which is finally obtained particularly excellent. Further, in a case where the binding solution P12 (colored ink) including a pigment is used for producing the three-dimensional structure P10, it is possible to suitably hold the pigment in the pores P1111 of the grains P111. Accordingly, it is possible to prevent unintentional diffusion of the pigment and to reliably form a high-definition image.

The shape of the grains P111 constituting the powder for three-dimensional forming is not particularly limited, but the grains having a spherical shape are preferable. In this manner, it is possible to make the fluidity of the powder for three-dimensional forming and the fluidity of the composition (composition for three-dimensional forming) P11 including the powder for three-dimensional forming particularly excellent, to make the productivity of the three-dimensional forming product P10 particularly excellent, to effectively prevent the generation or the like of unintentional unevenness in the three-dimensional structure P10 to be produced, and to make the dimensional precision of the three-dimensional structure P10 particularly excellent.

The porosity of the powder for three-dimensional forming is preferably in the range of 70% to 98% and more preferably in the range of 75% to 97.7%. In this manner, it is possible to make the mechanical strength of the three-dimensional structure P10 particularly excellent. Further, it is possible to make the fluidity of the powder for three-dimensional forming and the fluidity of the composition (composition for three-dimensional forming) P11 including the powder for three-dimensional forming particularly excellent, to make the productivity of the three-dimensional forming product P10 particularly excellent, to effectively prevent the generation or the like of unintentional unevenness in the three-dimensional structure P10 to be produced, and to make the dimensional precision of the three-dimensional structure P10 particularly excellent. Moreover, in the invention the porosity of the powder for three-dimensional forming means a ratio of the total of the volume of pores included in the entirety of grains (particles) constituting the powder for three-dimensional forming and the volume of pores present among grains (particles) with respect to the capacity of the container, and is a value represented by "$\{(P0-P)/P0\} \times 100$" when the bulk density of the powder for three-dimensional forming is set as P $[g/cm^3]$ and the true density of the constituent material of the powder for three-dimensional forming is set as P0 $[g/cm^3]$ in a case where the container having a predetermined capacity (for example, 100 mL) is filled with the powder for three-dimensional forming.

The content ratio of the powder for three-dimensional forming in the composition (composition for three-dimensional forming) P11 is preferably in the range of 10% by mass to 90% by mass and more preferably in the range of 15% by mass to 65% by mass. In this manner, it is possible to make the fluidity of the composition (composition for three-dimensional forming) P11 sufficiently excellent and to make the mechanical strength of the three-dimensional structure P10 which is finally obtained particularly excellent.

Water-Soluble Resin

The composition P11 may include plural grains P111 and a water-soluble resin P112.

By including the water-soluble resin P112, the grains P111 are bonded (temporary fixing) to each other in a region for which the binding solution P12 of the layer P1 is not provided (see FIG. 12) and unintentional scattering of the grains P111 can be effectively prevented. In this manner, it is possible to further improve the safety of an operator and the dimensional precision of the three-dimensional structure P10 to be produced.

Further, in a case where the grains P111 are subjected to the hydrophobic treatment even when the water-soluble resin P112 is included, the water-soluble resin P112 is effectively prevented from entering the pores P1111 of the grains P111. Accordingly, the function of the water-soluble resin P112 which temporarily fixes the grains P111 to each other is reliably exhibited. In addition, a problem in that a space for which the binder P121 enters may not be secured because the water-soluble resin P112 enters the pores P1111 of the grains P111 in advance can be reliably prevented.

It is preferable that at least a part of the water-soluble resin P112 is soluble in water. For example, the solubility in water at 25° C. (mass of the water-soluble resin soluble in 100 g of water) is preferably 5 [g/100 g of water] or more and more preferably 10 [g/100 g of water] or more.

Examples of the water-soluble resin P112 include synthetic polymers such as polyvinyl alcohol (PVA), polyvinylpyrrolidone (PVP), polycaprolactone diol, sodium polyacrylate, polyacrylamide, modified polyamide, polyethylene imine, polyethylene oxide, and a random copolymer of ethylene oxide and propylene oxide; natural polymers such as cornstarch, mannan, pectin, agar, alginic acid, dextran, glue, and gelatin; and semi-synthetic polymers such as carboxymethyl cellulose, hydroxyethyl cellulose, oxidized starch, and modified starch, and these can be used alone or in combination of two or more kinds thereof.

Specific examples of the water-soluble resin product include methyl cellulose (Metolose SM-15, manufactured by Shin-Etsu Chemical Co., Ltd.), hydroxyethyl cellulose (AL-15, manufactured by Fuji Chemical Industries, Ltd.), hydroxypropyl cellulose (HPC-M, manufactured by NIPPON SODA CO., LTD.), carboxymethyl cellulose (CMC-30, manufactured by Nichirin Chemical Industries, Ltd.), sodium starch phosphate ester (I) (HOSTER 5100, manufactured by Matsutani Chemical Industry Co., Ltd.), polyvinylpyrrolidone (PVP K-90, manufactured by Tokyo Chemical Co., Ltd.), methyl vinyl ether/maleic acid anhydride polymer (AN-139, manufactured by GAF Gauntlet, Inc.), polyacrylamide (manufactured by Wako Pure Chemical Industries, Ltd.), modified polyamide (modified nylon, AG NYLON, manufactured by Toray Industries, Inc.), polyethylene oxide (PEO-1, manufactured by Steel Chemical Co., Ltd., ALKOX, manufactured by Meisei Chemical Industries Co., Ltd.), a random copolymer of ethylene oxide and propylene oxide (ALKOX EP, manufactured by Meisei Chemical Industries Co., Ltd.), sodium polyacrylate (manufactured by Wako Pure Chemical Industries, Ltd.), and carboxy vinyl polymer/cross-linked acrylic water-soluble resin (AQUPEC, manufactured by Sumitomo Seika Chemicals Co., Ltd.).

Among these, in a case where the water-soluble resin P112 is polyvinyl alcohol, it is possible to make the mechanical strength of the three-dimensional structure P10 particularly excellent. Further, by adjusting the degree of saponification or the degree of polymerization, it is possible to more suitably control properties of the water-soluble resin P112 (for example, water-soluble properties or water resistance properties) and properties of the composition P11 (for example, the viscosity, the fixed power of the grains P111, or the wettability). Accordingly, it is possible to more suitably respond to production of various three-dimensional structures P10. Further, polyvinyl alcohol is low in price among various kinds of water-soluble resins and the supply thereof is stabilized. Therefore, it is possible to produce a stabilized three-dimensional structure P10 while reducing the production cost.

In a case where the water-soluble resin P112 includes polyvinyl alcohol, the degree of saponification of the polyvinyl alcohol is preferably in the range of 85 to 90. In this manner, it is possible to suppress a decrease in solubility of polyvinyl alcohol in water. Accordingly, it is possible to more effectively suppress a decrease in adhesiveness between adjacent layers P1 in a case where the composition P11 contains water.

In a case where the water-soluble resin P112 contains polyvinyl alcohol, the degree of polymerization of the polyvinyl alcohol is preferably in the range of 300 to 1000. In this manner, in the case where the composition P11 contains water, it is possible to make the mechanical strength of each layer P1 or the adhesiveness between adjacent layers P1 particularly excellent.

Further, in a case where the water-soluble resin P112 is polyvinylpyrrolidone (PVP), the following effects can be obtained. That is, since polyvinylpyrrolidone has excellent adhesiveness with respect to various materials such as glass, metal, or plastic, it is possible to make the stability of the strength or the shape of a region for which the binding solution P12 is not provided in the layer P1 particularly excellent and to make the dimensional precision of the three-dimensional structure P10 which is finally obtained particularly excellent. Further, since polyvinylpyrrolidone shows excellent solubility in various organic solvents, in a case where the composition P11 includes an organic solvent, it is possible to make the fluidity of the composition P11 particularly excellent, to suitably form the layer P1 in which unintentional unevenness in thickness is more effectively prevented, and to make the dimensional precision of the three-dimensional structure P10 which is finally obtained particularly excellent. Further, since polyvinylpyrrolidone shows excellent solubility in water, grains which are not bonded with the binder P121 can be easily and reliably removed from the grains P111 constituting each layer P1 during the unbonded particle removing process (after forming is completed). Moreover, since polyvinylpyrrolidone has suitable affinity for the powder for three-dimensional forming, polyvinylpyrrolidone is unlikely to enter the pores P1111 as described above, but the wettability with respect to the surface of the grains P111 is relatively high. Therefore, it is possible to more effectively exhibit the function of fixing the grains temporarily as described above. Further, since polyvinylpyrrolidone has excellent affinity for various colorants, unintentional diffusion of a colorant can be effectively prevented in a case where the binding solution P12 including a colorant is used during the binding solution providing process. In addition, when the paste-like composition P11 contains polyvinylpyrrolidone, it is possible to effectively prevent bubbles from being rolled in the compound P11 and to more effectively prevent the generation of defects due to rolling-in of bubbles.

In a case where the water-soluble resin P112 contains polyvinylpyrrolidone, the weight average molecular weight of the polyvinylpyrrolidone is preferably in the range of 10000 to 1700000 and more preferably in the range of 30000 to 1500000. In this manner, the above-described functions can be more effectively exhibited.

Further, in a case where the water-soluble resin P112 is polycaprolactone diol, it is possible to make the composition P11 have a pellet shape and to more effectively prevent unintentional scattering or the like of the grains P111. Accordingly, the handleability (easiness of handling) of the composition P11 is improved, and accordingly, it is possible to improve the stability of an operator and the dimensional precision of the three-dimensional structure P10 to be produced and to allow the three-dimensional structure P10 to be melted at a relatively low temperature. Therefore, it is possible to suppress the energy and the cost necessary for production of the three-dimensional structure P10 and to make the productivity of the three-dimensional structure P10 sufficiently excellent.

In a case where the water-soluble resin P112 contains polycarolactone diol, the weight average molecular weight of the polycarolactone diol is preferably in the range of 10000 to 1700000 and more preferably in the range of 30000 to 1500000. In this manner, the above-described functions can be more effectively exhibited.

In the composition P11, it is preferable that the water-soluble resin P112 is in a state of a liquid (for example, a dissolved state or a melted state) at least during the layer forming process. In this manner, it is possible to easily and reliably further improve the uniformity in thickness of the layer P1 to be formed using the composition P11.

Solvent

The composition P11 may include a volatile solvent (not illustrated in FIG. 12) in addition to the above-described components.

In this manner, it is possible to make the composition P11 have a paste shape, to make the fluidity of the composition P11 stably excellent, and to make the productivity of the three-dimensional structure P10 particularly excellent.

It is preferable that a solvent dissolves the water-soluble resin P112. In this manner, it is possible to make the fluidity of the composition P11 excellent and to more effectively prevent unintentional unevenness in thickness of the layer P1 to be formed using the composition P11. Further, when the layer P1 in a state in which a solvent is removed is formed, it is possible to adhere the water-soluble resin P112 to the grains P111 with excellent uniformity over the entire layer P1 and to more effectively prevent the generation of unintentional unevenness in composition. Therefore, it is possible to more effectively prevent the generation of unintentional unevenness in mechanical strength in each region of the three-dimensional structure P10 which is finally obtained and to further improve the reliability of the three-dimensional structure P10. Further, in the configuration illustrated in FIG. 12, a solvent is not illustrated and the water-soluble resin P112 is adhered to a part of the outer surface of the grains P111 in a state in which the water-soluble resin P112 is deposited. However, in a case where a solvent is included, the water-soluble resin P112 is included in the composition P11 in a state of being dissolved in the solvent and the solvent may be present in a state of wetting the surface of the grains P111 (for example, a surface other than the surface of the pores P1111 of the grains P111).

Examples of the solvent constituting the composition P11 include water; an alcohol-based solvent such as methanol, ethanol, or isopropanol; a ketone-based solvent such as methyl ethyl ketone or acetone; a glycol ether-based solvent such as ethylene glycol monoethyl ether or ethylene glycol monobutyl ether; a glycol ether acetate-based solvent such as propylene glycol 1-monomethylether 2-acetate or propylene glycol 1-monoethylether 2-acetate; polyethylene glycol; and polypropylene glycol, and these can be used alone or in combination of two or more kinds thereof.

It is preferable that the composition P11 contains water among those described above. In this manner, it is possible to reliably dissolve the water-soluble resin P112 and to make the fluidity of the composition P11 and the uniformity of the composition of the layer P1 to be formed using the composition P11 particularly excellent. Further, water can be easily removed after the layer P1 is formed and does not adversely affect the three-dimensional structure P10 when water remains therein. Moreover, water is advantageous from viewpoints of stability with respect to a human body and environmental problems.

In a case where the composition P11 includes a solvent, the content ratio of the solvent in the composition P11 is preferably in the range of 5% by mass to 75% by mass and more preferably in the range of 35% by mass to 70% by mass. In this manner, since effects generated when a solvent is included are better exhibited and the solvent can be easily removed in a short period of time during the process of producing the three-dimensional structure P10, a solvent is advantageous from a viewpoint of improving productivity of the three-dimensional structure P10.

Particularly, in a case where the composition P11 includes water as a solvent, the content ratio of water in the composition P11 is preferably in the range of 20% by mass to 73% by mass and more preferably in the range of 50% by mass to 70% by mass. In this manner, effects described above are better exhibited.

Other Components

Further, the composition P11 may contain components other than those described above. Examples of the components include a polymerization initiator, a polymerization accelerator, a permeation promoter, a wetting agent (moisturizing agent), a fixing agent, a fungicide, a preservative, an antioxidant, a UV absorber, a chelating agent, and a pH adjusting agent.

Second Embodiment

Next, a composition to be ejected according to an ink jet method described in the third embodiment of the production method of the invention and in the second embodiment of the apparatus for forming a three-dimensional structure of the invention will be described.

In the present embodiment, the ink P16' for forming an entity portion and the ink P17' for forming a supporting portion are used as the composition.

Ink for Forming Entity Portion

The ink P16' for forming an entity portion includes at least a curable resin (curing component).

Curable Resin

Examples of the curable resin (curing component) include various light curable resins such as a thermosetting resin, a visible light curable resin that is cured by light in a visible light region (light curable resin in the narrow sense), a UV curable resin, and an infrared curable resin; and an X-ray curable resin, and these can be used alone or in combination of two or more kinds thereof.

Among these, a UV curable resin (polymerizable compound) is particularly preferable from viewpoints of mechanical strength of the three-dimensional structure P10 to be obtained, productivity of the three-dimensional structure P10, and storage stability of the ink P16' for forming an entity portion.

As the UV curable resin (polymerizable compound), a resin in which addition polymerization or ring-opening polymerization is started by radicals or cations generated from a photopolymerization initiator due to irradiation with UV rays and a polymer is generated is preferably used. Examples of the polymerization mode of the addition polymerization include a radical, a cation, an anion, a metathesis, and coordination polymerization, and examples of the polymerization mode of the ring-opening polymerization include a cation, an anion, a radical, a metathesis, and coordination polymerization.

As an addition-polymerizable compound, a compound having at least one ethylenically unsaturated double bond can be exemplified. As the addition-polymerizable compound, a compound having at least one and preferably two or more terminal ethylenically unsaturated bonds can be preferably used.

The ethylenically unsaturated polymerizable compound has a chemical form of a monofunctional polymerizable compound and a polyfunctional polymerizable compound or a mixture of these two.

Examples of the monofunctional polymerizable compound include unsaturated carboxylic acid (for example, acrylic acid, methacrylic acid, itaconic acid, crotonic acid, isocrotonic acid, or maleic acid), esters thereof, and amides.

As the polyfunctional polymerizable compounds, esters of unsaturated carboxylic acid and an aliphatic polyhydric alcohol compound and amides of unsaturated carboxylic acid and an aliphatic amine compound are used.

Further, an addition reaction product of unsaturated carboxylic acid esters or amides having a nucleophilic substituent such as a hydroxyl group, an amino group, or a mercapto group; isocyanates; and epoxys, and a dehydration condensation reaction product with carboxylic acid can be used. Further, an addition reaction product of unsaturated carboxylic acid esters or amides having an electrophilic substituent such as an isocyanate group or an epoxy group; alcohols; amines; and thiols, and a substitution reaction product of unsaturated carboxylic acid esters or amides having a dissociable substituent such as a halogen group or a tosyloxy group; alcohols; amines; or thiols can be used.

Specific examples of a radical polymerizable compound which is an ester between unsaturated carboxylic acid and an aliphatic polyhydric alcohol compound include (meth) acrylic acid ester as a typical example, a monofunctional (meth)acrylic acid ester, and a polyfunctional (meth)acrylic acid ester.

Specific examples of the monofunctional (meth)acrylate include tolyloxyethyl(meth)acrylate, phenyloxyethyl(meth) acrylate, cyclohexyl(meth)acrylate, ethyl(meth)acrylate, methyl(meth)acrylate, isobornyl(meth)acrylate, dipropyleneglycol di(meth)acrylate, tetrahydrofurfuryl(meth)acrylate, ethoxyethoxyethyl(meth)acrylate, 2-(2-vinyloxyethoxy) ethyl(meth)acrylate, 2-hydroxy-3-phenoxypropyl(meth) acrylate, and 4-hydroxybutyl(meth)acrylate.

Specific examples of the difunctional (meth)acrylate include ethyleneglycol di(meth)acrylate, triethyleneglycol di(meth)acrylate, 1,3-butanediol di(meth)acrylate, tetramethyleneglycol di(meth)acrylate, propyleneglycol di(meth) acrylate, neopentylglycol di(meth)acrylate, hexanediol di(meth)acrylate, 1,4-cyclohexanediol di(meth)acrylate, tetraethyleneglycol di(meth)acrylate, pentaerythritol di(meth) acrylate, and dipentaerythritol di(meth)acrylate.

Specific examples of the trifunctional (meth)acrylate include trimethylolpropane tri(meth)acrylate, trimethylolethane tri(meth)acrylate, alkyleneoxide-modified tri(meth) acrylate of trimethylolpropane, pentaerythritol tri(meth)acrylate, dipentaerythritol tri(meth)acrylate, trimethylolpropane tri((meth)acryloyloxypropyl)ether, isocyanuric acid alkyleneoxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth) acrylate.

Specific examples of the tetrafunctional (meth)acrylate include pentaerythritol tetra(meth)acrylate, sorbitol tetra (meth)acrylate, ditrimethylolpropane tetra(meth)acrylate, propionic acid dipentaerythritol tetra(meth)acrylate, and ethoxylated pentaerythritol tetra(meth)acrylate.

Specific examples of the pentafunctional (meth)acrylate include sorbitol penta(meth)acrylate and dipentaerythritol penta(meth)acrylate.

Specific examples of the hexafunctional (meth)acrylate include dipentaerythritol hexa(meth)acrylate, sorbitol hexa (meth)acrylate, alkyleneoxide-modified hexa(meth)acrylate of phosphazene, and caprolactone-modified dipentaerythritol hexa(meth)acrylate.

Examples of the polymerizable compounds other than (meth)acrylate include itaconic acid ester, crotonic acid ester, isocrotonic acid ester, and maleic acid ester.

Examples of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid ester include ethylene glycol dicrotonate, tetramethylene glycol dicrotonate, pentaerythritol dicrotonate, and sorbitol dicrotonate.

Examples of isocrotonic acid ester include ethylene glycol diisocrotonate, pentaerythritol diisocrotonate, and sorbitol tetraisocrotonate.

Examples of maleic acid ester include ethylene glycol dimaleate, triethylene glycol dimaleate, pentaerythritol dimaleate, and sorbitol tetramaleate.

Examples of other esters include aliphatic alcohol esters described in JP-B-46-27926, JP-B-51-47334, JP-A-57-196231; esters having an aromatic skeleton described in JP-A-59-5240, JP-A-59-5241, and JP-A-2-226149, and esters containing an amino group described in JP-A-1-165613.

Specific examples of monomers of amide between unsaturated carboxylic acid and an aliphatic amine compound include methylene bis-acrylamide, methylene bis-methacrylamide, 1,6-hexamethylene bis-acrylamide, 1,6-hexamethylene bis-methacrylamide, diethylenetriamine trisacrylamide, xylylene bis-acrylamide, xylylene bis-methacrylamide, and (meth)acryloyl morpholine.

Preferred examples of other amide-based monomers include monomers having a cyclohexylene structure described in JP-B-54-21726 can be exemplified.

Further, a urethane-based addition polymerizable compound to be produced using an addition reaction between isocyanate and a hydroxyl group is preferable and examples thereof include a vinyl urethane compound containing two or more polymerizable vinyl groups in one molecule which is obtained by adding a vinyl monomer containing a hydroxyl group represented by the following formula (1) to a polyisocyanate compound having two or more isocyanate groups in one molecule described in JP-B-48-41708.

CH2=C(R1)COOCH2CH(R2)OH    (1)

(in this case, R1 and R2 each independently represent H or CH3 in the formula (1))

In the invention, a cationic ring-opening polymerizable compound having one or more cyclic ether groups such as an epoxy group or an oxetane group in one molecule can be preferably used as a UV curable resin (polymerizable compound).

Examples of the cationically polymerizable compound include curable compounds containing a ring-opening polymerizable group, and, among these, a heterocyclic group-containing curable compound is particularly preferable. Examples of the curable compound include cycle imino ethers such as an epoxy derivative, an oxetane derivative, a tetrahydrofuran derivative, a cyclic lactone derivative, a cyclic carbonate derivative, and an oxazoline derivative, and vinyl ethers. Among these, an epoxy derivative, an oxetane derivative, and vinyl ethers are preferable.

Preferred examples of the epoxy derivative include monofunctional glycidyl ethers, polyfunctional glycidyl ethers, monofunctional alicyclic epoxys, and polyfunctional alicyclic epoxys.

Specific examples of the compounds of glycidyl ethers include diglycidyl ethers (for example, ethylene glycol diglycidyl ether and bisphenol A diglycidyl ether); tri- or higher functional glycidyl ethers (for example, trimethylol ethane triglycidyl ether, trimethylol propane triglycidyl ether, glycerol triglycidyl ether, and triglycidyl trishydroxyethyl isocyanurate); tetra- or higher functional glycidyl ethers (for example, sorbitol tetraglycidyl ether, pentaerythritol tetraglycidyl ether, polyglycidyl ether of a cresol novolac resin, and polyglycidyl ether of a phenyl novolac resin); alicyclic epoxys (for example, CELLOXIDE 2021P, CELLOXIDE2081, Epolead GT-301, and Epolead GT-401 (all manufactured by Daicel Chemical Industries, Ltd.)); EHPE (manufactured by Daicel Chemical Industries, Ltd.); polycyclohexyl epoxy methyl ether of a phenol novolac resin; oxetanes (for example, OX-SQ and PNOX-1009 (both manufactured by Toagosei Co., Ltd.).

As the polymerizable compound, an alicyclic epoxy derivative can be preferably used. The term "alicyclic epoxy group" means a partial structure obtained by epoxidizing a double bond of a cycloalkene ring such as a cyclopentene group or a cyclohexene group with a suitable oxidant such as hydrogen peroxide or peracid.

As the alicyclic epoxy compound, polyfunctional alicyclic epoxys having two or more cyclohexene oxide groups or cyclopentene oxide groups in one molecule are preferable. Specific examples of the alicyclic epoxy compound include 4-vinylcyclohexene dioxide, (3,4-epoxychclohexyl)methyl-3,4-epoxycyclohexyl carboxylate, di(3,4-epoxycyclohexyl) adipate, di(3,4-epoxycyclohexylmethyl)adipate, bis(2,3-epoxycyclopentyl)ether, di(2,3-epoxy-6-methylcyclohexylmethyl)adipate, and dicyclopentadiene dioxide.

The glycidyl compound having a normal epoxy group which does not include an alicyclic structure in a molecule may be used alone or in combination with the above-described alicyclic epoxy compound.

As such a normal glycidyl compound, for example, a glycidyl ether compound or a glycidyl ester compound can be exemplified, but a combination with a glycidyl ether compound is preferable.

Specific examples of the glycidyl ether compound include an aromatic glycidyl ether compound such as 1,3-bis(2,3-epoxypropyloxy)benzene, a bisphenol A type epoxy resin, a bisphenol F type epoxy resin, a phenol•novolac type epoxy resin, a cresol•novolac type epoxy resin, or a trisphenol methane type epoxy resin; and an aliphatic glycidyl ether compound such as 1,4-butanediol glycidyl ether, glycerol triglycidyl ether, propylene glycol diglycidyl ether, or trimethylol propane triglycidyl ether. As the glycidyl ester, for example, glycidyl ester of linolenic acid dimer or the like can be exemplified.

As the polymerizable compound, a compound having an oxetanyl group which is cyclic ether of a 4-membered ring (hereinafter, simply referred to as an "oxetane compound") can be used. The oxetanyl group-containing compound is a compound having one or more oxetanyl groups in one molecule.

It is preferable that the ink P16' for forming an entity portion includes one or more kinds selected from a group consisting of (meth)acrylic acid-2-(2-hydroxyethoxyl)ethyl, polyether-based aliphatic urethane(meth)acrylate oligomer, 2-hydroxy-3-phenoxypropyl(meth)acrylate, and 4-hydroxybutyl(meth)acrylate among curing components described above.

In this manner, it is possible to make the mechanical strength and stability of the shape of the entity portion P16 to be formed by curing the ink P16' for forming an entity portion particularly excellent. As a result, it is possible to make the strength, durability, and reliability of the three-dimensional structure P10 particularly excellent.

Further, by including these curing components, it is possible to lower the solubility and swelling properties with respect to various solvents (for example, water) of a cured material of the ink P16' for forming an entity portion. Accordingly, it is possible to more reliably remove the supporting portion P17 with high selectivity during the supporting portion removing process and to prevent unintentional deformation due to generation of defects in the entity portion P16. As a result, it is possible to more reliably increase the dimensional precision of the three-dimensional structure P10.

Further, since the swelling properties (absorbency of a solvent) of a cured material of the ink P16' for forming an entity portion can be lowered, it is possible to omit or simplify the drying process as a post-treatment after the supporting portion removing process. In addition, since the solvent resistance of the three-dimensional structure P10 which is finally obtained is improved, the reliability of the three-dimensional product P10 is particularly increased.

Particularly, when the ink P16' for forming an entity portion includes (meth)acrylic acid-2-(2-vinyloxyethoxyl)ethyl, the ink is unlikely to be inhibited by oxygen and curing with lower energy becomes possible. Further, it is possible to particularly increase the strength of the three-dimensional structure P10 by promoting copolymerization with other monomers.

Further, when the ink P16' for forming an entity portion contains polyether-based aliphatic urethane(meth)acrylate oligomer, it is possible to achieve both of high strength and high toughness of the three-dimensional structure P10 at a higher level.

Moreover, when the ink P16' for forming an entity portion contains 2-hydroxy-3-phenoxypropyl(meth)acrylate, the ink becomes flexible and thus the breaking elongation can be improved.

In addition, when the ink P16' for forming an entity portion contains 4-hydroxybutyl(meth)acrylate, the adhesiveness to PMMA, PEMA particles, silica particles, or metal particles is improved and thus the strength of the three-dimensional structure P10 can be particularly increased.

In a case where the ink P16' for forming an entity portion contains (one or more kinds selected from a group consisting of above-described specific curing components of (meth)acrylic acid 2-(2-vinyloxyethoxyl)ethyl, polyether-based aliphatic urethane(meth)acrylate oligomer, 2-hydroxy-3-phenoxypropyl(meth)acrylate, and 4-hydroxybutyl(meth)acrylate), the ratio of the specific curing components with respect to the entirety of curing components constituting the ink P16' for forming an entity portion is preferably 80% by mass or more, more preferably 90% by mass or more, and still more preferably 100% by mass. In this manner, the above-described effects are better exhibited.

The content ratio of the curing components in the ink P16' for forming an entity portion is preferably in the range of 80% by mass to 97% by mass and more preferably in the range of 85% by mass to 95% by mass.

In this manner, it is possible to make the mechanical strength of the three-dimensional structure P10 which is finally obtained particularly excellent. Further, it is possible to make the productivity of the three-dimensional structure P10 particularly excellent.

Polymerization Initiator

Further, it is preferable that the ink 16' for forming an entity portion includes a polymerization initiator.

In this manner, it is possible to accelerate the curing speed of the ink 16' for forming an entity portion at the time of producing the three-dimensional structure P10 and to make the productivity of the three-dimensional structure P10 particularly excellent.

Examples of the polymerization initiator include radical photopolymerization initiators (aromatic ketones, an acyl phosphine oxide compound, an aromatic onium salt compound, an organic peroxide, a thio compound (a thioxanthone compound, or a thiophenyl group-containing compound), a hexaaryl biimidazole compound, a ketoxime ester compound, a borate compound, an azinium compound, a metallocene compound, an active ester compound, a compound having a carbon-halogen bond, and an alkyl amine compound); and a cationic photopolymerization initiator. Specific examples thereof include acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbozole, 3-methyl acetophenone, 4-chlorobenzophenone, 4,4'-dimethoxy benzophenone, 4,4'-diaminobenzophenone, Michler's ketone, benzoin propyl ether, benzoin ethyl ether, benzyl dimethyl ketal, 1-(4-isopropyl phenyl)-2-hydroxy-2-methylpropane-1-one, 2-hydroxy-2-methyl-1-phenylpropane-1-one, thioxanethone, diethyl thioxanthone, 2-isopropyl thioxanthone, 2-chlorothioxanthone, 2-methyl-1-[4-(methylthio)phenyl]-2-morpholino-propane-1-one, bis(2,4,6-trimethylbenzoyl)-phenyl phosphine oxide, 2,4,6-trimethyl benzoyl-diphenyl-phosphine oxide, 2,4-diethylthioxanthone, and bis-(2,6-dimethoxybenzoyl)-2,4,4-trimethylpentyl phosphine oxide, and these can be used alone or in combination of two or more kinds thereof.

Among these, it is preferable that the polymerization initiator constituting the ink P16' for forming an entity portion includes bis(2,4,6-trimethylbenzoyl)-phenylphosphine oxide, and/or 2,4,6-trimethylbenzoyl-diphenyl-phosphine oxide.

By containing such a polymerization initiator, it is possible to make the appearance of the three-dimensional structure P10 more reliably excellent and to make the productivity of the three-dimensional structure P10 particularly excellent.

Further, it is possible to make the mechanical strength and the stability of the shape of the entity portion P16 to be formed by curing the ink P16' for forming an entity portion particularly excellent. As a result, it is possible to make the strength, durability, and reliability of the three-dimensional structure P10 particularly excellent.

A specific value of the content ratio of the polymerization initiator in the ink P16' for forming an entity portion is preferably in the range of 3.0% by mass to 18% by mass and more preferably in the range of 5.0% by mass to 15% by mass.

In this manner, it is possible to make the appearance of the three-dimensional structure P10 more reliably excellent and to make the productivity of the three-dimensional structure P10 particularly excellent. Further, it is possible to make the mechanical strength and the stability of the shape of the entity portion P16 to be formed by curing the ink P16' for forming an entity portion particularly excellent. As a result, it is possible to make the strength, durability, and reliability of the three-dimensional structure P10 particularly excellent.

Other Components

Further, the ink P16' for forming an entity portion may contain other components other than those described above.

Examples of such components include various colorants such as a pigment and a dye; a dispersant, a surfactant; a sensitizer; a polymerization accelerator; a solvent; a permeation promoter; a wetting agent (moisturizing agent); a fixing agent; a fungicide; a preservative; an antioxidant; a UV absorber; a chelating agent; a pH adjusting agent; a thickener; a filler; an aggregation inhibitor; and a defoaming agent.

Particularly, when the ink P16' for forming an entity portion contains a colorant, the three-dimensional structure P10 colored in a color corresponding to the color of the colorant can be obtained.

Particularly, when the colorant includes a pigment, it is possible to make the light resistance of the ink P16' for forming an entity portion and the three-dimensional structure P10 excellent. Any of an inorganic pigment and an organic pigment can be used as a pigment.

Examples of the inorganic pigment include carbon blacks (C. I. Pigment Black 7) such as furnace black, lamp black, acetylene black, and channel black; iron oxide; and titanium oxide, and these can be used alone or in combination of two or more kinds thereof.

Among the inorganic pigments, titanium oxide is preferable in order to express a preferred white color.

Examples of the organic pigments include an azo pigment such as an insoluble azo pigment, a condensed azo pigment, azo lake, or a chelate azo pigment; a polycyclic pigment such as a phthalocyanine pigment, a perylene and perinone pigment, an anthraquinone pigment, a quinacridone pigment, a dioxane pigment, a thioindigo pigment, an isoindolinone pigment; or a quinophthalone pigment; dye chelate (for example, basic dye chelate or acidic dye chelate); dye lake (basic dye lake or acidic dye lake); a nitro pigment; a nitroso pigment; aniline black; and daylight fluorescent pigment, and these can be used alone or in combination of two or more kinds thereof.

More specifically, examples of the carbon black used as a black pigment include No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (all manufactured by Degussa).

Examples of the white pigment include C. I. Pigment White 6, 18, and 21.

Examples of the yellow pigment include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violet Red 19, 23, 32, 33, 36, 38, 43, and 50.

Examples of the cyan pigment include C. I. Pigment Blue 1, 2, 3, 15, 15:1, 15:2, 15:3, 15:34, 15:4, 16, 18, 22, 25, 60, 65, and 66; and C. I. Pigment Bat Blue 4 and 60.

Further, examples of other pigments include C. I. Pigment Green 7 and 10; C. I. Pigment Brown 3, 5, 25, and 26; and C. I. Pigment Orange 1, 2, 5, 7, 13, 14, 15, 16, 24, 34, 36, 38, 40, 43, and 63.

In a case where the ink P16' for forming an entity portion contains a pigment, the average particle diameter of the pigment is preferably 300 nm or less and more preferably 50 nm to 250 nm.

In this manner, it is possible to make the ejection stability of the ink P16' for forming an entity portion and the dispersion stability of the pigment in the ink P16' for forming an entity portion particularly excellent and to form an image with more excellent image quality.

Further, examples of the dye include an acid dye, a direct dye, a reactive dye, and a basic dye, and these can be used alone or in combination of two or more kinds thereof.

Specific examples thereof include C. I. Acid Yellow 17, 23, 42, 44, 79, and 142; C. I. Acid Red 52, 80, 82, 249, 254, and 289; C. I. Acid Blue 9, 45, and 249; C. I. Acid Black 1, 2, 24, and 94; C. I. Food Black 1 and 2; C. I. Direct Yellow 1, 12, 24, 33, 50, 55, 58, 86, 132, 142, 144, and 173; C. I. Direct Red 1, 4, 9, 80, 81, 225, and 227; C. I. Direct Blue 1, 2, 15, 71, 86, 87, 98, 165, 199, and 202; C. I. Direct Black 19, 38, 51, 71, 154, 168, 171, and 195; C. I. Reactive Red 14, 32, 55, 79, and 249; and C. I. Reactive Black 3, 4, and 35.

In a case where the ink P16' for forming an entity portion includes a colorant, the content ratio of the colorant in the ink P16' for forming an entity portion is preferably in the range of 1% by mass to 20% by mass. In this manner, particularly excellent high properties and color reproducibility can be obtained.

Particularly, in a case where the ink P16' for forming an entity portion contains titanium oxide as a colorant, the content ratio of the titanium oxide in the ink P16' for forming an entity portion is preferably in the range of 12% by mass to 18% by mass and more preferably in the range of 14% by mass to 16% by mass. In this manner, particularly excellent hiding properties can be obtained.

In a case where the ink P16' for forming an entity portion contains a pigment, when the ink further contains a dispersant, it is possible to make the dispersibility of the pigment and a conductive substance more excellent.

As the dispersant, which is not particularly limited, a dispersant normally used for preparing a pigment dispersion liquid of a polymer dispersant or the like can be exemplified.

Specific examples of the polymer dispersant include dispersants having one or more kinds, as a main component, among polyoxyalkylene polyalkylene polyamine, a vinyl polymer, a vinyl copolymer, an acrylic polymer, an acrylic copolymer, polyester, polyamide, polyimide, polyurethane, an amino polymer, a silicon-containing polymer, a sulfur-containing polymer, a fluorine-containing polymer, and an epoxy polymer.

Examples of a commercially available product of the polymer dispersant include AJISPER series (manufactured by Ajinomoto Fine-Techno Co., Inc.); Solsperse series (Solsperse 36000 or the like) which can be obtained from Noveon; and Disperbyk series (manufactured by BYK-Chemie Co., Ltd.); and DISPARLON series (manufactured by Kusumoto Chemicals, Ltd.).

In a case where the ink P16' for forming an entity portion contains a surfactant, it is possible to make the abrasion resistance of the three-dimensional structure P10 more excellent.

As a surfactant, which is not particularly limited, polyester-modified silicone or polyether-modified silicone can be used as a silicone-based surfactant, and polyether-modified polydimethylsiloxane or polyester-modified polydimethylsiloxane is preferably used.

Specific examples of the surfactant include BYK-347, BYK-348, BYK-UV3500, 3510, 3530, and 3570 (all manufactured by manufactured by BYK-Chemie Co., Ltd.).

Further, the ink P16' for forming an entity portion may include a solvent.

In this manner, it is possible to suitably adjust the viscosity of the ink P16' for forming an entity portion and to make the ejection stability of the ink P16' for forming an entity portion according to an ink jet method particularly excellent even when the ink P16' for forming an entity portion contains components with high viscosity.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol, and these can be used alone or in combination of two or more kinds thereof.

Further, the viscosity of the ink P16' for forming an entity portion is preferably in the range of 10 mPa·s to 30 mPa·s and more preferably in the range of 15 mPa·s to 25 mPa·s.

In this manner, it is possible to make the ejection stability of the ink P16' for forming an entity portion particularly excellent. Further, in the present specification, the viscosity is a value measured using an E type viscometer (VISCONIC ELD, manufactured by Tokyo Keiki Co., Ltd.) at 25° C.

In the present embodiment, an ink P16A' for forming a first entity portion (ink for forming an insulating unit) and an ink P16B' for forming a second entity portion (ink for forming an antenna) are used as the ink P16' for forming an entity portion.

The ink P16B' for forming a second entity portion (ink for forming an antenna) contains a conductive substance as a constituent material of an antenna P16B.

As the conductive substance, for example, various metals can be used.

The average particle diameter of the conductive substance contained in the second ink P16B' for forming an entity portion (ink for forming an antenna) is preferably in the range of 50 nm to 30 μm.

The insulation resistance value of a first entity portion (insulating unit) P16A formed using the ink P16A' for forming a first entity portion (ink for forming an insulating unit) at 25° C. is preferably $1 \times 10^5 \Omega$ or more.

Further, the insulation resistance value can be acquired through measurement in conformity with JIS C 2140.

In addition, Super Megoh Meter SM-5E (manufactured by Toa Electronics Industries Co., Ltd.) can be used for measuring the insulation resistance value.

Ink for Forming Supporting Portion

The ink P17' for forming a supporting portion contains at least a curable resin (curing component).

Curable Resin

As the curable resin (curing component) constituting the ink P17' for forming a supporting portion, resins which are the same as curable resins (curing components) exemplified as the constituent components of the ink P16' for forming an entity portion are exemplified.

Particularly, it is preferable that the curable resin (curing component) constituting the ink P17' for forming a supporting portion and the curable resin (curing component) constituting the ink P16' for forming an entity portion described above are cured by the same energy rays.

In this manner, it is possible to effectively prevent the configuration of the apparatus for producing a three-dimensional structure from being complicated and to make the productivity of the three-dimensional structure P10 particularly excellent. Further, it is possible to more reliably control the surface shape of the three-dimensional structure P10.

It is preferable that the ink P17' for forming a supporting portion contains one or more kinds selected from a group consisting of tetrahydrofurfuryl(meth)acrylate, ethoxyethoxyethyl(meth)acrylate, polyethylene glycol di(meth)acrylate, and (meth)acryloyl morpholine among various curing components.

In this manner, it is possible to make the appearance of the three-dimensional structure P10 more reliably excellent and to make the productivity of the three-dimensional structure P10 particularly excellent.

Further, it is possible to make the mechanical strength of the supporting portion P17 to be formed by curing the ink P17' for forming a supporting portion and the stability of the shape particularly excellent. As a result, it is possible to more suitably support the ink P16' for forming an entity portion for forming an upper layer (second layer) using the supporting portion P17 which is a lower layer (first layer) at the time of producing the three-dimensional structure P10. Accordingly, it is possible to more suitably prevent unintentional deformation (particularly, sagging or the like) of the entity portion P16 and to make the dimensional precision of the three-dimensional formed body P10 which is finally obtained more excellent.

Particularly, when the ink P17' for forming a supporting portion contains (meth)acryloyl morpholine, the following effects can be obtained.

That is, (meth)acryloyl morpholine has high solubility in various solvents such as water in a state in which the curing is not complete (polymer of (meth)acryloyl morpholine in a state in which the curing is not complete) even when the curing reaction progresses. Therefore, it is more effectively prevent the generation of defects in the entity portion P16 and to selectively, reliably, and efficiently remove the supporting portion P17 during the supporting portion removing process described above. As a result, it is possible to obtain the three-dimensional structure P10 in a desired shape with higher reliability and excellent productivity.

Further, when the ink P17' for forming a supporting portion contains tetrahydrofurfuryl(meth)acrylate, the flexibility can be more suitably held after the curing. Accordingly, the supporting portion P17 enters more easily a gel-like state in a treatment using a liquid removing the supporting portion P17 and thus the removal efficiency of the supporting portion P17 can be further increased.

Moreover, when the ink P17' for forming a supporting portion contains ethoxyethoxyethyl(meth)acrylate, it is possible to increase the removal efficiency of the supporting portion P17 during the process using a liquid removing the supporting portion P17.

In addition, when the ink P17' for forming a supporting portion contains polyethylene glycol di(meth)acrylate, in a case where the liquid removing the supporting portion P17 uses water as a main component, it is possible to increase the solubility in the liquid and to more easily remove the supporting portion P17.

In a case where the ink P17' for forming a supporting portion contains the above-described specific curing components (one or more kinds selected from a group consisting of tetrahydrofurfuryl(meth)acrylate, ethoxyethoxyethyl(meth)acrylate, polyethylene glycol di(meth)acrylate, and (meth)acryloyl morpholine), the ratio of the specific curing components with respect to the entirety of curing components constituting the ink P17' for forming a supporting portion is preferably 80% by mass or more, more preferably 90% by mass or more, and still more preferably 100% by mass. In this manner, the above-described effects are better exhibited.

The content ratio of the curing components in the ink P17' for forming a supporting portion is preferably in the range of 83% by mass to 98.5% by mass and more preferably in the range of 87% by mass to 95.4% by mass.

In this manner, it is possible to make the stability of the shape of the supporting portion P17 to be formed particularly excellent. Further, in a case where layers P1 are laminated with each other at the time of producing the three-dimensional structure P10, it is possible to more effectively prevent unintentional deformation of the lower layer P1 and to suitably support the upper layer P1. As a result, it is possible to make the dimensional precision of the three-dimensional structure P10 which is finally obtained particularly excellent. Further, it is possible to make the productivity of the three-dimensional structure P10 particularly excellent.

Polymerization Initiator

Further, it is preferable that the ink 17' for forming a supporting portion includes a polymerization initiator.

In this manner, it is possible to accelerate the curing speed of the ink 17' for forming a supporting portion at the time of producing the three-dimensional structure P10 and to make the productivity of the three-dimensional structure P10 particularly excellent.

In addition, it is possible to make the stability of the shape of the supporting portion P17 to be formed particularly excellent. Further, in a case where layers P1 are laminated with each other at the time of producing the three-dimensional structure P10, it is possible to more effectively prevent unintentional deformation of the lower layer P1 and to suitably support the upper layer P1. As a result, it is possible to make the dimensional precision of the three-dimensional structure P10 which is finally obtained particularly excellent.

As the polymerization initiator constituting the ink P17' for forming a supporting portion, the same polymerization initiators exemplified above as constituent components of the ink 16' for forming an entity portion can be exemplified.

Among these, it is preferable that the ink P17' for forming a supporting portion includes bis(2,4,6-trimethylbenzoyl)-phenylphosphine oxide, and/or 2,4,6-trimethylbenzoyl-diphenyl-phosphine oxide as a polymerization initiator.

By containing such a polymerization initiator, it is possible to make the appearance of the three-dimensional structure P10 more reliably excellent and to make the productivity of the three-dimensional structure P10 particularly excellent.

Further, it is possible to make the mechanical strength of the supporting portion P17 to be formed by curing the ink P17' for forming a supporting portion and the stability of the shape particularly excellent. As a result, it is possible to more suitably support the ink P16' for forming an entity portion for forming an upper layer (second layer) using the supporting portion P17 which is a lower layer (first layer) at the time of producing the three-dimensional structure P10. Accordingly, it is possible to more suitably prevent unintentional deformation (particularly, sagging or the like) of the entity portion P16 and to make the dimensional precision of the three-dimensional formed body P10 which is finally obtained more excellent.

A specific value of the content ratio of the polymerization initiator in the ink P17' for forming a supporting portion is preferably in the range of 1.5% by mass to 17% by mass and more preferably in the range of 4.6% by mass to 13% by mass.

In this manner, it is possible to make the appearance of the three-dimensional structure P10 more reliably excellent and to make the productivity of the three-dimensional structure P10 particularly excellent.

Further, it is possible to make the mechanical strength of the supporting portion P17 to be formed by curing the ink P17' for forming a supporting portion and the stability of the shape particularly excellent. As a result, it is possible to more suitably support the ink P16' for forming an entity portion for forming the upper layer (second layer) using the supporting portion P17 which is the lower layer (first layer) at the time of producing the three-dimensional structure P10. Accordingly, it is possible to more suitably prevent unintentional deformation (particularly, sagging or the like) of the entity portion P16 and to make the dimensional precision of the three-dimensional formed body P10 which is finally obtained more excellent.

Other Components

Further, the ink P17' for forming a supporting portion may contain other components other than those described above. Examples of such components include various colorants such as a pigment and a dye; a dispersant, a surfactant; a sensitizer; a polymerization accelerator; a solvent; a permeation promoter; a wetting agent (moisturizing agent); a fixing agent; a fungicide; a preservative; an antioxidant; a UV absorber; a chelating agent; a pH adjusting agent; a thickener; a filler; an aggregation inhibitor; and a defoaming agent.

Particularly, when the ink P17' for forming a supporting portion contains a colorant, the visibility of the supporting portion P17 is improved. Accordingly, it is possible to more reliably prevent unintentional remaining of at least a part of the supporting portion P17 in the three-dimensional structure P10 which is finally obtained.

As the colorant constituting the ink P17' for forming a supporting portion, the same colorants exemplified above as the constituent components of the ink P16' for forming an entity portion are exemplified, but a colorant having a different color from the color of the entity portion P16 (the color to be visually recognized from the appearance of the three-dimensional structure P10) that is overlapped with the supporting portion P17 to be formed by the ink P17' for forming a supporting portion when observed in the normal direction of the surface of the three-dimensional structure P10 is preferable. In this manner, the effects described above are better exhibited.

In a case where the ink P17' for forming a supporting portion contains a pigment, when the ink further contains a dispersant, it is possible to make the dispersibility of the pigment more excellent. As the dispersant constituting the ink P17' for forming a supporting portion, the same dispersants exemplified above as the constituent components of the ink P16' for forming an entity portion are exemplified.

Further, the viscosity of the ink P17' for forming a supporting portion is preferably in the range of 10 mPa·s to 30 mPa·s and more preferably in the range of 15 mPa·s to 25 mPa·s.

In this manner, it is possible to make the ejection stability of the ink P17' for forming a supporting portion particularly excellent.

Moreover, the ink P17' for forming plural kinds of supporting portions may be used for producing the three-dimensional structure P10.

Binding Solution

Next, a binding solution (the binding solution used in the first and second embodiments of the production method of the invention and used in the first embodiment of the apparatus for producing a three-dimensional structure of the invention) used for producing the three-dimensional structure of the invention will be described in detail.

The binding solution P12 contains at least the binder P121.

Binder

The binder P121 is not particularly limited as long as the binding solution has a function of binding the grains P111, but a binder including pores P1111 described below as the grains P111 and having hydrophobicity (lipophilicity) in a case of using a binding solution to which a hydrophobic treatment is applied is preferable. In this manner, the affinity between the bonding solution P12 and the grains P111 to which a hydrophobic treatment is applied can be increased and the binding solution P12 can suitably enter the pores P1111 of the grains P111 to which the hydrophobic treatment is applied by providing the binding solution P12 for the layer P1. As a result, the anchor effect due to the binder P121 is remarkably exhibited and thus it is possible to make the mechanical strength of the three-dimensional structure P10 which is finally obtained particularly excellent. In addition, it is preferable that the hydrophobic binder P121 has sufficiently low affinity for water. For example, the binding solution whose solubility in water at 25° C. is 1 [g/100 g of water] or less is preferable.

Examples of the binder P121 include various light curable resins such as a thermosetting resin, a thermosetting resin, a visible light curable resin that is cured by light in a visible light region (light curable resin in the narrow sense), a UV curable resin, and an infrared curable resin; and an X-ray curable resin, and these can be used alone or in combination of two or more kinds thereof. It is preferable that the binder P121 includes a thermosetting resin from a viewpoint of mechanical strength of the three-dimensional structure P10 to be obtained and the productivity of the three-dimensional structure P10. Further, among various thermosetting resins, a UV thermosetting resin (polymerizable compound) is particularly preferable from viewpoints of the mechanical strength of the three-dimensional structure P10, the productivity of the three-dimensional structure P10, and the storage stability of the binding solution P12.

As the UV curable resin (polymerizable compound), a resin in which addition polymerization or ring-opening polymerization is started by radicals or cations generated from a photopolymerization initiator due to irradiation with UV rays and a polymer is generated is preferably used. Examples of the polymerization mode of the addition polymerization include a radical, a cation, an anion, a metathesis, and coordination polymerization, and examples of the polymerization mode of the ring-opening polymerization include a cation, an anion, a radical, a metathesis, and coordination polymerization.

As an addition-polymerizable compound, a compound having at least one ethylenically unsaturated double bond can be exemplified. As the addition-polymerizable compound, a compound having at least one and preferably two or more terminal ethylenically unsaturated bonds can be preferably used.

The ethylenically unsaturated polymerizable compound has a chemical form of a monofunctional polymerizable compound and a polyfunctional polymerizable compound or a mixture of these two. Examples of the monofunctional polymerizable compound include unsaturated carboxylic acid (for example, acrylic acid, methacrylic acid, itaconic acid, crotonic acid, isocrotonic acid, or maleic acid), esters thereof, and amides. As the polyfunctional polymerizable compounds, esters of unsaturated carboxylic acid and an aliphatic polyhydric alcohol compound and amides of unsaturated carboxylic acid and an aliphatic amine compound are used.

Further, an addition reaction product of unsaturated carboxylic acid esters or amides having a nucleophilic substituent such as a hydroxyl group, an amino group, or a mercapto group; isocyanates; and epoxys, and a dehydration condensation reaction product with carboxylic acid can be used. Further, an addition reaction product of unsaturated carboxylic acid esters or amides having an electrophilic substituent such as an isocyanate group or an epoxy group; alcohols; amines; and thiols, and a substitution reaction product of unsaturated carboxylic acid esters or amides having a dissociable substituent such as a halogen group or a tosyloxy group; alcohols; amines; or thiols can be used.

Specific examples of a radical polymerizable compound which is an ester between unsaturated carboxylic acid and an aliphatic polyhydric alcohol compound include (meth) acrylic acid ester as a typical example, a monofunctional (meth)acrylic acid ester, and a polyfunctional (meth)acrylic acid ester.

Specific examples of the monofunctional (meth)acrylate include tolyloxyethyl(meth)acrylate, phenyloxyethyl(meth) acrylate, cyclohexyl(meth)acrylate, ethyl(meth)acrylate, methyl(meth)acrylate, isobornyl(meth)acrylate, and tetrahydrofurfuryl(meth)acrylate.

Specific examples of the difunctional (meth)acrylate include ethyleneglycol di(meth)acrylate, triethyleneglycol di(meth)acrylate, 1,3-butanediol di(meth)acrylate, tetramethyleneglycol di(meth)acrylate, propyleneglycol di(meth) acrylate, neopentylglycol di(meth)acrylate, hexanediol di(meth)acrylate, 1,4-cyclohexanediol di(meth)acrylate, tetraethyleneglycol di(meth)acrylate, pentaerythritol di(meth) acrylate, and dipentaerythritol di(meth)acrylate.

Specific examples of the trifunctional (meth)acrylate include trimethylolpropane tri(meth)acrylate, trimethylolethane tri(meth)acrylate, alkyleneoxide-modified tri(meth) acrylate of trimethylolpropane, pentaerythritol tri(meth)acrylate, dipentaerythritol tri(meth)acrylate, trimethylolpropane tri((meth)acryloyloxypropyl)ether, isocyanuric acid alkyleneoxide-modified tri(meth)acrylate, propionic acid dipentaerythritol tri(meth)acrylate, tri((meth)acryloyloxyethyl) isocyanurate, hydroxypivalaldehyde-modified dimethylolpropane tri(meth)acrylate, and sorbitol tri(meth) acrylate.

Specific examples of the tetrafunctional (meth)acrylate include pentaerythritol tetra(meth)acrylate, sorbitol tetra (meth)acrylate, ditrimethylolpropane tetra(meth)acrylate, propionic acid dipentaerythritol tetra(meth)acrylate, and ethoxylated pentaerythritol tetra(meth)acrylate.

Specific examples of the pentafunctional (meth)acrylate include sorbitol penta(meth)acrylate and dipentaerythritol penta(meth)acrylate.

Specific examples of the hexafunctional (meth)acrylate include dipentaerythritol hexa(meth)acrylate, sorbitol hexa (meth)acrylate, alkyleneoxide-modified hexa(meth)acrylate of phosphazene, and caprolactone-modified dipentaerythritol hexa(meth)acrylate.

Examples of the polymerizable compounds other than (meth)acrylate include itaconic acid ester, crotonic acid ester, isocrotonic acid ester, and maleic acid ester.

Examples of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid ester include ethylene glycol dicrotonate, tetramethylene glycol dicrotonate, pentaerythritol dicrotonate, and sorbitol dicrotonate.

Examples of isocrotonic acid ester include ethylene glycol diisocrotonate, pentaerythritol diisocrotonate, and sorbitol tetraisocrotonate.

Examples of maleic acid ester include ethylene glycol dimaleate, triethylene glycol dimaleate, pentaerythritol dimaleate, and sorbitol tetramaleate.

Examples of other esters include aliphatic alcohol esters described in JP-B-46-27926, JP-B-51-47334, JP-A-57-196231; esters having an aromatic skeleton described in JP-A-59-5240, JP-A-59-5241, and JP-A-2-226149, and esters containing an amino group described in JP-A-1-165613.

Specific examples of monomers of amide between unsaturated carboxylic acid and an aliphatic amine compound include methylene bis-acrylamide, methylene bis-methacrylamide, 1,6-hexamethylene bis-acrylamide, 1,6-hexamethylene bis-methacrylamide, diethylenetriamine trisacrylamide, xylylene bis-acrylamide, and xylylene bis-methacrylamide.

Preferred examples of other amide-based monomers include monomers having a cyclohexylene structure described in JP-B-54-21726 can be exemplified.

Further, a urethane-based addition polymerizable compound to be produced using an addition reaction between isocyanate and a hydroxyl group is preferable and specific examples thereof include a vinyl urethane compound containing two or more polymerizable vinyl groups in one molecule which is obtained by adding a vinyl monomer containing a hydroxyl group represented by the following formula (1) to a polyisocyanate compound having two or more isocyanate groups in one molecule described in JP-B-48-41708.

$$CH_2=C(R1)COOCH_2CH(R2)OH \qquad (1)$$

(in this case, R1 and R2 each independently represent H or CH3 in the formula (1))

In the invention, a cationic ring-opening polymerizable compound having one or more cyclic ether groups such as an epoxy group or an oxetane group in one molecule can be preferably used as a UV curable resin (polymerizable compound).

Examples of the cationically polymerizable compound include curable compounds containing a ring-opening polymerizable group, and, among these, a heterocyclic group-containing curable compound is particularly preferable. Examples of the curable compound include cycle imino ethers such as an epoxy derivative, an oxetane derivative, a tetrahydrofuran derivative, a cyclic lactone derivative, a cyclic carbonate derivative, and an oxazoline derivative, and vinyl ethers. Among these, an epoxy derivative, an oxetane derivative, and vinyl ethers are preferable.

Preferred examples of the epoxy derivative include monofunctional glycidyl ethers, polyfunctional glycidyl ethers, monofunctional alicyclic epoxys, and polyfunctional alicyclic epoxys.

Specific examples of the compounds of glycidyl ethers include diglycidyl ethers (for example, ethylene glycol diglycidyl ether and bisphenol A diglycidyl ether); tri- or higher functional glycidyl ethers (for example, trimethylol ethane triglycidyl ether, trimethylol propane triglycidyl ether, glycerol triglycidyl ether, and triglycidyl trishydroxyethyl isocyanurate); tetra- or higher functional glycidyl ethers (for example, sorbitol tetraglycidyl ether, pentaerythritol tetraglycidyl ether, polyglycidyl ether of a cresol novolac resin, and polyglycidyl ether of a phenyl novolac resin); alicyclic epoxys (for example, CELLOXIDE 2021P, CELLOXIDE2081, Epolead GT-301, and Epolead GT-401 (all manufactured by Daicel Chemical Industries, Ltd.)); EHPE (manufactured by Daicel Chemical Industries, Ltd.); polycyclohexyl epoxy methyl ether of a phenol novolac resin; oxetanes (for example, OX-SQ and PNOX-1009 (both manufactured by Toagosei Co., Ltd.).

As the polymerizable compound, an alicyclic epoxy derivative can be preferably used. The term "alicyclic epoxy group" means a partial structure obtained by epoxidizing a double bond of a cycloalkene ring such as a cyclopentene group or a cyclohexene group with a suitable oxidant such as hydrogen peroxide or peracid.

As the alicyclic epoxy compound, polyfunctional alicyclic epoxys having two or more cyclohexene oxide groups or cyclopentene oxide groups in one molecule are preferable. Specific examples of the alicyclic epoxy compound include 4-vinylcyclohexene dioxide, (3,4-epoxychclohexyl)methyl-3,4-epoxycyclohexyl carboxylate, di(3,4-epoxycyclohexyl)adipate, di(3,4-epoxycyclohexylmethyl)adipate, bis(2,3-epoxycyclopentyl)ether, di(2,3-epoxy-6-methylcyclohexylmethyl)adipate, and dicyclopentadiene dioxide.

The glycidyl compound having a normal epoxy group which does not include an alicyclic structure in a molecule may be used alone or in combination with the above-described alicyclic epoxy compound.

As such a normal glycidyl compound, for example, a glycidyl ether compound or a glycidyl ester compound can be exemplified, but a combination with a glycidyl ether compound is preferable.

Specific examples of the glycidyl ether compound include an aromatic glycidyl ether compound such as 1,3-bis(2,3-epoxypropyloxy)benzene, a bisphenol A type epoxy resin, a bisphenol F type epoxy resin, a phenol•novolac type epoxy resin, a cresol•novolac type epoxy resin, or a trisphenol methane type epoxy resin; and an aliphatic glycidyl ether compound such as 1,4-butanediol glycidyl ether, glycerol triglycidyl ether, propylene glycol diglycidyl ether, or trimethylol propane triglycidyl ether. As the glycidyl ester, for example, glycidyl ester of linolenic acid dimer or the like can be exemplified.

As the polymerizable compound, a compound having an oxetanyl group which is cyclic ether of a 4-membered ring (hereinafter, simply referred to as an "oxetane compound") can be used. The oxetanyl group-containing compound is a compound having one or more oxetanyl groups in one molecule.

The content ratio of the binder P121 in the binding solution P12 is preferably 80% or more and more preferably 85% or more. In this manner, it is possible to make the mechanical strength of the three-dimensional structure P10 which is finally obtained particularly excellent.

Other Components

Further, the binding solution P12 may contain other components other than those described above. Examples of such components include various colorants such as a pigment and a dye; a dispersant; a surfactant; a sensitizer; a polymerization accelerator; a solvent; a permeation promoter; a wetting agent (moisturizing agent); a fixing agent; a fungicide; a preservative; an antioxidant; a UV absorber; a chelating agent; a pH adjusting agent; a thickener; a filler; an aggregation inhibitor; and a defoaming agent.

Particularly, when the binding solution P12 contains a colorant, the three-dimensional structure P10 colored in a color corresponding to the color of the colorant can be obtained.

Particularly, when the colorant includes a pigment, it is possible to make the light resistance of the binding solution P12 and the three-dimensional structure P10 excellent. Any of an inorganic pigment and an organic pigment can be used as a pigment.

Examples of the inorganic pigment include carbon blacks such as furnace black, lamp black, acetylene black, and channel black (C. I. Pigment Black 7); iron oxide; and titanium oxide, and these can be used alone or in combination of two or more kinds thereof.

Among the inorganic pigments, titanium oxide is preferable in order to express a preferred white color.

Examples of the organic pigments include an azo pigment such as an insoluble azo pigment, a condensed azo pigment, azo lake, or a chelate azo pigment; a polycyclic pigment such as a phthalocyanine pigment, a perylene and perinone pigment, an anthraquinone pigment, a quinacridone pigment, a dioxane pigment, a thioindigo pigment, an isoindolinone pigment, or a quinophthalone pigment; dye chelate (for example, basic dye chelate or acidic dye chelate); dye lake (basic dye lake or acidic dye lake); a nitro pigment; a nitroso pigment; aniline black; and daylight fluorescent pigment, and these can be used alone or in combination of two or more kinds thereof.

More specifically, examples of the carbon black used as a black pigment include No. 2300, No. 900, MCF88, No. 33, No. 40, No. 45, No. 52, MA7, MA8, MA100, and No. 2200B (all manufactured by Mitsubishi Chemical Corporation); Raven 5750, Raven 5250, Raven 5000, Raven 3500, Raven 1255, and Raven 700 (all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by CABOT JAPAN K.K.); Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all manufactured by Degussa).

Examples of the white pigment include C. I. Pigment White 6, 18, and 21.

Examples of the yellow pigment include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the magenta pigment include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48, (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violet Red 19, 23, 32, 33, 36, 38, 43, and 50.

Examples of the cyan pigment include C. I. Pigment Blue 1, 2, 3, 15, 15:1, 15:2, 15:3, 15:34, 15:4, 16, 18, 22, 25, 60, 65, and 66; and C. I. Pigment Bat Blue 4 and 60.

Further, examples of other pigments include C. I. Pigment Green 7 and 10; C. I. Pigment Brown 3, 5, 25, and 26; and C. I. Pigment Orange 1, 2, 5, 7, 13, 14, 15, 16, 24, 34, 36, 38, 40, 43, and 63.

In a case where the binding solution P12 contains a pigment, the average particle diameter of the pigment is preferably 300 nm or less and more preferably 50 nm to 250 nm. In this manner, it is possible to make the ejection stability of the binding solution P12 and the dispersion stability of the pigment in the binding solution P12 particularly excellent and to form an image with more excellent image quality.

Further, examples of the dye include an acid dye, a direct dye, a reactive dye, and a basic dye, and these can be used alone or in combination of two or more kinds thereof.

Specific examples thereof include C. I. Acid Yellow 17, 23, 42, 44, 79, and 142; C. I. Acid Red 52, 80, 82, 249, 254, and 289; C. I. Acid Blue 9, 45, and 249; C. I. Acid Black 1, 2, 24, and 94; C. I. Food Black 1 and 2; C. I. Direct Yellow 1, 12, 24, 33, 50, 55, 58, 86, 132, 142, 144, and 173; C. I. Direct Red 1, 4, 9, 80, 81, 225, and 227; C. I. Direct Blue 1, 2, 15, 71, 86, 87, 98, 165, 199, and 202; C. I. Direct Black 19, 38, 51, 71, 154, 168, 171, and 195; C. I. Reactive Red 14, 32, 55, 79, and 249; and C. I. Reactive Black 3, 4, and 35.

In a case where the binding solution P12 includes a colorant, the content ratio of the colorant in the binding solution P12 is preferably in the range of 1% by mass to 20% by mass. In this manner, particularly excellent high properties and color reproducibility can be obtained.

Particularly, in a case where the binding solution P12 contains titanium oxide as a colorant, the content ratio of the titanium oxide in the binding solution P12 for forming an entity portion is preferably in the range of 12% by mass to 18% by mass and more preferably in the range of 14% by mass to 16% by mass. In this manner, particularly excellent hiding properties can be obtained.

In a case where the binding solution P12 contains a pigment, when the ink further contains a dispersant, it is possible to make the dispersibility of the pigment more excellent. As the dispersant, which is not particularly limited, a dispersant normally used for preparing a pigment dispersion liquid of a polymer dispersant or the like can be exemplified. Specific examples of the polymer dispersant include dispersants having one or more kinds, as a main component, among polyoxyalkylene polyalkylene polyamine, a vinyl polymer, a vinyl copolymer, an acrylic polymer, an acrylic copolymer, polyester, polyamide, polyimide, polyurethane, an amino polymer, a silicon-containing polymer, a sulfur-containing polymer, a fluorine-containing polymer, and an epoxy polymer. Examples of a commercially available product of the polymer dispersant include AJISPER series (manufactured by Ajinomoto Fine-Techno Co., Inc.); Solsperse series (Solsperse 36000 or the like) which can be obtained from Noveon; and Disperbyk series (manufactured by BYK-Chemie Co., Ltd.); and DISPARLON series (manufactured by Kusumoto Chemicals, Ltd.).

In a case where the binding solution P12 contains a surfactant, it is possible to make the abrasion resistance of the three-dimensional structure P10 more excellent. As a surfactant, which is not particularly limited, polyester-modified silicone or polyether-modified silicone can be used as a silicone-based surfactant, and polyether-modified polydimethylsiloxane or polyester-modified polydimethylsiloxane is preferably used. Specific examples of the surfactant include BYK-347, BYK-348, BYK-UV3500, 3510, 3530, and 3570 (all manufactured by manufactured by BYK-Chemie Co., Ltd.).

Further, the binding solution P12 may include a solvent. In this manner, it is possible to suitably adjust the viscosity of the binding solution P12 and to make the ejection stability of the binding solution P12 according to an ink jet method particularly excellent even when the binding solution P12 contains components with high viscosity.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol, and these can be used alone or in combination of two or more kinds thereof.

Further, the viscosity of the binding solution P12 is preferably in the range of 10 mPa·s to 30 mPa·s and more preferably in the range of 15 mPa·s to 25 mPa·s. In this manner, it is possible to make the ejection stability of the binding solution P12 particularly excellent.

Further, plural binding solution P12 may be used for producing the three-dimensional structure P10.

For example, the binding solution P12 (colored ink) containing a colorant and the binding solution P12 (clear ink) containing no colorant may be used. In this manner, for example, the binding solution P12 containing a colorant as the binding solution P12 provided for an area influencing the color tone of the appearance of the three-dimensional structure P10 or the binding solution P12 containing no colorant as the binding solution P12 provided for an area not influencing the color tone of the appearance the three-dimensional structure P10 may be used. Further, in the three-dimensional structure P10 which is finally obtained, plural kinds of binding solutions P12 may be used together such that an area (coat layer) formed using the binding solution P12 containing no colorant is provided on the outermost surface of the area formed using the binding solution P12 containing a colorant.

In addition, for example, plural kinds of binding solutions P12 containing colorants with different compositions from each other may be used. In this manner, a color reproduction area which can be expressed can be widened because of the combination of these binding solutions P12.

When plural kinds of binding solutions P12 are used, it is preferable to use at least an indigo purple (cyan) binding solution P12, a red purple (magenta) binding solution P12, and a yellow binding solution P12. In this manner, a color reproduction area which can be expressed can be more widened because of the combination of these binding solutions P12.

Further, for example, the following effects can be obtained by combining a white binding solution P12 and a binding solution P12 having another color. That is, the three-dimensional structure P10 which is finally obtained may have a first area for which the white binding solution is provided and an area (second area), which is overlapped with the first area and for which the binding solution P12 having a non-white color, provided on the outer surface side more than the first area. In this manner, the first area for which the white binding solution P12 is provided can exhibit hiding properties and the color saturation of the three-dimensional structure P10 can be further improved.

Three-Dimensional Structure

The three-dimensional structure of the invention can be produced using the production method and the apparatus for producing a three-dimensional structure described above. In this manner, it is possible to provide the three-dimensional structure which can be subjected to individual management easily and reliably.

As the usage of the three-dimensional structure of the invention, which is not particularly limited, an object for appreciation or display such as a doll or a figure; and a medical device such as an implant can be exemplified.

Further, the three-dimensional structure of the invention may be applied to any of a prototype, a mass-produced product, or an order-made product.

Moreover, preferred embodiments of the invention have been described, but the invention is not limited thereto.

For example, in the above-described embodiments, a case in which a concave portion or a convex portion is formed before the RFID tag is mounted is mainly described, but these concave portion and convex portion may not be formed in the invention.

Further, in the above-described embodiments, a case in which the thickness of the RFID tag is smaller than or equal to the thickness of the layer is described as a typical example, but the thickness of the RFID tag may be greater than that of the layer and the RFID tag may be arranged over plural layers.

Further, in the above-described embodiments, a case of using a squeegee as a flattening unit is mainly described, but a roller or the like may be used in place of a squeegee.

Moreover, the apparatus for producing a three-dimensional structure of the invention may include a recovery mechanism (not illustrated) for recovering compositions which are not used for forming a layer among compositions supplied from the composition supply unit. In this manner, since it is possible to prevent excessive amount of compositions from being stored in the layer forming unit and to supply a sufficient amount of compositions, generation of defects in the layer can be more effectively prevented and the three-dimensional structure can be more stably produced. Further, since the recovered compositions can be used for production of the three-dimensional structure, this can contribute to reducing the production cost of the three-dimensional structure, which is preferable from a viewpoint of saving resources.

Further, the apparatus for producing a three-dimensional structure of the invention may include a recovery mechanism for recovering compositions which are removed during the unbonded particle removing process.

In addition, in the above-described embodiments, the description is made that bonding units are formed on all layers, but layers on which bonding units are not formed may be present. For example, a layer formed directly on the stage does not have a bonding unit formed thereon and may function as a sacrificial layer.

Moreover, in the above-described embodiments, a case in which the binding solution providing process is performed according to an ink jet method is mainly described, but the binding solution providing process may be performed using another method (for example, another printing method).

Moreover, the ink for forming an entity portion and the ink for forming a supporting portion may be provided according to another method other than the ink jet method (for example, another printing method).

Moreover, in the above-described embodiments, in addition to the layer forming process and the binding solution providing process, the description is made that the curing process is repeatedly performed along with the layer forming process and the binding solution providing process, but the curing process may not be repeatedly performed. For example, a laminate including plural layers which are not cured is formed and then the process may be collectively performed.

Further, in the production method of the invention, a pre-treatment process, an intermediate treatment process, and a post-treatment process may be performed if necessary.

As the pre-treatment process, for example, a cleaning process or the like of the stage can be exemplified.

As the intermediate treatment process, a process of stopping heating (water-soluble resin solidifying process) may be included between the layer forming process and the binding solution providing process in a case where the composition for three-dimensional forming has a pellet shape. In this manner, since the water-soluble resin enters a solid state, it is possible to obtain a layer with high bonding strength among grains. Further, for example, in a case where the composition for three-dimensional forming contains a solvent component (dispersant) such as water, a solvent component removing process removing the solvent component may be included between the layer forming process and the binding solution providing process. In this manner, the layer forming process can be more smoothly performed and unintentional unevenness in the thickness of a layer to be formed can be more effectively prevented. As a result, it is possible to produce the three-dimensional structure with higher dimensional precision and higher productivity.

As the post-treatment process, for example, a washing process, a shape adjusting process that performs deburring or the like, a coloring process, a coating layer forming process, or a process of completing curing a binder that performs a light irradiation treatment or a heat treatment for reliably curing an uncured binder can be exemplified.

Further, in the above-described embodiments, the method including the binding solution providing process and the curing process (bonding process) is mainly described, but the curing process (bonding process) does not need to be provided after the binding solution providing process in a case where a binder containing a thermoplastic resin is used for the binding solution (the binding solution providing process may serve as the bonding process). Further, in such a case, the apparatus for producing a three-dimensional structure may not include an energy irradiation unit (curing unit).

Further, in the above-described embodiments, the description is made that the flattening unit moves on the stage, but the positional relationship between the stage and the squeegee may be changed due to the movement of the flattening unit on the stage and the stage may be flattened.

The entire disclosure of Japanese Patent Application No. 2014-051282, filed Mar. 14, 2014 is expressly incorporated by reference herein.

What is claimed is:

1. A method of producing a three-dimensional structure, the method comprising:
   obtaining a temporarily formed body, the obtaining of the temporarily forming including
      forming a body portion layer, which corresponds to a portion of the three-dimensional structure, on a stage by ejecting a first curable ink on the stage,
      forming a support portion layer on the stage to support the body portion layer by ejecting a second curable ink on the stage such that the body portion layer and the support portion layer are adjacent to each other,
      mounting an RFID tag on the body portion layer,
      forming a new body portion layer, which corresponds to a portion of the three-dimensional structure, by ejecting the first curable ink on the RFID tag after mounting of the RFID tag, and
      forming a new support portion layer to support the new body portion layer by ejecting the second curable liquid such that the new body portion layer and the new support portion layer are adjacent to each other; and
   removing the support portion layer and the new support portion layer from the temporarily formed body to obtain the three-dimensional structure.

2. The method of producing a three-dimensional structure according to claim 1, wherein the RFID tag is mounted on an area in a concave portion of the body portion layer or an area surrounded by a convex portion of the body portion layer.

3. A three-dimensional structure which is produced using the method according to claim 2.

4. The method of producing a three-dimensional structure according to claim 1,
   wherein the RFID tag is provided with an adhesive layer, and
   the RFID tag is fixed to the body portion layer through the adhesive layer.

5. A three-dimensional structure which is produced using the method according to claim 4.

6. The method of producing a three-dimensional structure according to claim 1, wherein the first curable liquid and the second curable liquid are ejected according to an ink jet method.

7. A three-dimensional structure which is produced using the method according to claim 6.

8. The method of producing a three-dimensional structure according to claim 1, wherein identification information related to the three-dimensional structure is recorded in the RFID tag.

9. A three-dimensional structure which is produced using the method according to claim 8.

10. The method of producing a three-dimensional structure according to claim 1, further comprising comparing identification information related to the three-dimensional structure recorded in the RFID tag before the RFID tag is mounted including information written thereon regarding the three-dimensional structure to be produced.

11. The method of producing a three-dimensional structure according to claim 1, wherein a conductive portion functioning as an antenna of the RFID tag is formed according to an ink jet method.

12. A three-dimensional structure which is produced using the method according to claim 1.

13. An apparatus for producing a three-dimensional structure which produces a three-dimensional structure, the apparatus comprising:
   a stage;
   an ink providing unit configured to eject a first curable ink and a second curable ink on the stage so as to form layers including at least a body portion layer that corresponds to a portion of the three-dimensional structure, a support portion layer that supports the body portion layer, a new body portion layer that corresponds to a portion of the three-dimensional structure, and a new support portion layer that supports the new body portion layer;
   an RFID tag mounting unit configured to mount an RFID tag on at least one of the layers;
   a supporting portion removing unit configured to remove the support portion layer and the new support portion layer from a temporarily formed body that has at least the body portion layer, the support portion layer, the new body portion layer, the new support portion layer, and the RFID tag; and
   a controller configured to control the ink providing unit and the RFID tag mounting unit to obtain the temporarily formed body, and control the supporting portion removing unit,
   the controller being configured to control the ink providing unit to form the body portion layer on the stage by ejecting the first curable ink on the stage and form the support portion layer on the stage by ejecting the second curable ink on the stare such that the body portion layer and the support portion layer are adjacent to each other,
   control the RFID tag mounting unit to mount the RFID tag on the body portion layer,
   control the ink providing unit to form the new body portion layer by ejecting the first curable ink on the RFID tag after mounting of the RFID tag, and form the new support portion layer by ejecting the second curable liquid such that the body portion layer and the new support portion layer are adjacent to each other, and
   control the supporting portion removing unit to remove the support portion layer and the new support portion layer from the temporarily formed body to obtain the three-dimensional structure.

14. The apparatus for producing a three-dimensional structure according to claim 13, further comprising an information writing unit that writes identification information related to the three-dimensional structure on the RFID tag.

15. The apparatus for producing a three-dimensional structure according to claim 13, further comprising an information reading unit that reads identification information related to the three-dimensional structure written in the RFID tag.

16. A three-dimensional structure which is produced using the apparatus for producing a three-dimensional structure according to claim 13.

\* \* \* \* \*